United States Patent
Anson et al.

(10) Patent No.: US 12,216,791 B2
(45) Date of Patent: Feb. 4, 2025

(54) RE-IDENTIFYING PSEUDONYMIZED OR DE-IDENTIFIED DATA UTILIZING DISTRIBUTED LEDGER TECHNOLOGY

(71) Applicant: Forcepoint, LLC, Austin, TX (US)

(72) Inventors: Chad Anson, Austin, TX (US); Robert N. Fielding, Austin, TX (US); Richard A. Ford, Austin, TX (US); Michael Green, Minneapolis, MN (US); John Holmes, Austin, TX (US); Adam Abraham, Austin, TX (US)

(73) Assignee: Forcepoint LLC, Austin, TX (US)

( * ) Notice: Subject to any disclaimer, the term of this patent is extended or adjusted under 35 U.S.C. 154(b) by 0 days.

(21) Appl. No.: 16/799,283

(22) Filed: Feb. 24, 2020

(65) Prior Publication Data
US 2021/0264054 A1    Aug. 26, 2021

(51) Int. Cl.
| | | |
|---|---|---|
| G06F 21/62 | (2013.01) | |
| G06F 21/31 | (2013.01) | |
| G06F 21/60 | (2013.01) | |
| G06F 21/72 | (2013.01) | |
| H04L 9/08 | (2006.01) | |

(52) U.S. Cl.
CPC .......... *G06F 21/6245* (2013.01); *G06F 21/31* (2013.01); *G06F 21/604* (2013.01); *G06F 21/725* (2013.01); *H04L 9/0861* (2013.01); *H04L 9/0891* (2013.01)

(58) Field of Classification Search
CPC .. G06F 21/6245; G06F 21/6254; G06F 21/31; G06F 21/604; G06F 21/725; H04L 9/0861; H04L 9/0891
See application file for complete search history.

(56) References Cited

U.S. PATENT DOCUMENTS

| | | |
|---|---|---|
| 7,395,201 B2 | 7/2008 | Shaw |
| 7,506,371 B1 | 3/2009 | Ben-Natan |
| 7,805,391 B2 | 9/2010 | Friedlander et al. |
| 7,895,448 B1 | 2/2011 | Satish |
| 8,082,349 B1 | 12/2011 | Bhargava et al. |
| 8,176,159 B2 | 5/2012 | Kashi |
| 8,214,364 B2 | 7/2012 | Bigus et al. |
| 8,549,629 B1 | 10/2013 | McCreesh et al. |
| 8,640,231 B2 | 1/2014 | Florencio et al. |
| 8,775,162 B2 | 7/2014 | Shaw |

(Continued)

OTHER PUBLICATIONS guardtime.com, KSI Blockchain Technology, printed Jul. 13, 2017.

(Continued)

*Primary Examiner* — Jason K Gee
*Assistant Examiner* — Brian William Avery
(74) *Attorney, Agent, or Firm* — Terrile, Cannatti & Chambers, LLP; Emmanuel A. Rivera

(57) ABSTRACT

A system, method, and computer-readable medium are disclosed for providing auditability of a distributed ledger technology (DLT) of de-identified data of entities, stored in the DLT. In certain embodiments, data related to an entity is de-identified. The de-identified data is stored in the DLT. Access to the de-identified data is determined. Instances of access to the de-identified data is recorded to the DLT. In certain embodiments, information used to re-identify the de-identified data is store on the DLT. Access to the information can also be determined and recorded to the DLT.

29 Claims, 15 Drawing Sheets

(56) References Cited

U.S. PATENT DOCUMENTS

| | | |
|---|---|---|
| 8,918,903 B1 | 12/2014 | Schepis et al. |
| 8,925,053 B1 | 12/2014 | Mehta |
| 8,963,806 B1 | 2/2015 | Starner et al. |
| 8,966,036 B1 | 2/2015 | Asgekar et al. |
| 9,130,986 B2 | 9/2015 | Troyansky |
| 9,224,008 B1 | 12/2015 | De et al. |
| 9,253,181 B2 | 2/2016 | Liu et al. |
| 9,275,345 B1 | 3/2016 | Song et al. |
| 9,393,488 B2 | 7/2016 | Brownlow et al. |
| 9,514,293 B1 | 12/2016 | Moritz et al. |
| 9,516,035 B1 | 12/2016 | Moritz et al. |
| 9,614,920 B1 | 4/2017 | Agarwal et al. |
| 9,665,733 B1 | 5/2017 | Sills et al. |
| 9,742,871 B1 | 8/2017 | Gibson et al. |
| 9,798,757 B2 | 10/2017 | Greene et al. |
| 9,798,883 B1 | 10/2017 | Gil et al. |
| 9,911,290 B1 | 3/2018 | Zalewski et al. |
| 10,013,728 B2 | 7/2018 | Schechter et al. |
| 10,019,561 B1 | 7/2018 | Shelton et al. |
| 10,020,076 B1 | 7/2018 | Anumalasetty et al. |
| 10,044,745 B1 | 8/2018 | Jones et al. |
| 10,049,664 B1 | 8/2018 | Indyk |
| 10,052,026 B1 | 8/2018 | Tran |
| 10,057,227 B1 | 8/2018 | Hess et al. |
| 10,061,916 B1 | 8/2018 | Jiang et al. |
| 10,063,562 B1 | 8/2018 | Molina-Markham et al. |
| 10,063,654 B2 | 8/2018 | Kirti et al. |
| 10,091,180 B1 | 10/2018 | Moritz et al. |
| 10,110,942 B2 | 10/2018 | Lyons et al. |
| 10,114,935 B2 | 10/2018 | Das et al. |
| 10,116,680 B1 | 10/2018 | Han et al. |
| 10,165,065 B1 | 12/2018 | Anantharaju et al. |
| 10,237,256 B1 | 3/2019 | Pena et al. |
| 10,237,298 B1 | 3/2019 | Nguyen et al. |
| 10,320,813 B1 | 6/2019 | Ahmed et al. |
| 10,325,209 B2 | 6/2019 | Sanchez et al. |
| 10,397,255 B1 | 8/2019 | Bhalotra et al. |
| 10,417,613 B1 | 9/2019 | Brisebois et al. |
| 10,424,296 B2 | 9/2019 | Penilla et al. |
| 10,489,066 B1 | 11/2019 | Krinke |
| 10,614,029 B2 | 4/2020 | DiRienzo |
| 10,726,325 B2 | 7/2020 | Krishnamurthy et al. |
| 11,036,884 B2 | 6/2021 | Gkoulalas-Divanis |
| 11,036,886 B2 | 6/2021 | Gkoulalas-Divanis |
| 2001/0040591 A1 | 11/2001 | Abbott et al. |
| 2002/0083025 A1 | 6/2002 | Robarts et al. |
| 2002/0173295 A1 | 11/2002 | Nykanen et al. |
| 2003/0154406 A1 | 8/2003 | Honarvar et al. |
| 2003/0204720 A1 | 10/2003 | Schoen et al. |
| 2003/0212546 A1 | 11/2003 | Shaw |
| 2003/0217024 A1 | 11/2003 | Kocher |
| 2004/0186809 A1 | 9/2004 | Schlesinger et al. |
| 2004/0225877 A1 | 11/2004 | Huang |
| 2005/0008148 A1 | 1/2005 | Jacobson |
| 2005/0044426 A1 | 2/2005 | Vogel et al. |
| 2005/0097364 A1 | 5/2005 | Edeki et al. |
| 2005/0165623 A1 | 7/2005 | Landi et al. |
| 2005/0236474 A1 | 10/2005 | Onuma et al. |
| 2006/0129817 A1 | 6/2006 | Borneman et al. |
| 2006/0136332 A1 | 6/2006 | Ziegler |
| 2006/0190822 A1 | 8/2006 | Sasson et al. |
| 2006/0195328 A1 | 8/2006 | Abraham et al. |
| 2006/0200435 A1 | 9/2006 | Flinn et al. |
| 2006/0230071 A1 | 10/2006 | Kass et al. |
| 2007/0067853 A1 | 3/2007 | Ramsey |
| 2007/0136573 A1 | 6/2007 | Steinberg |
| 2007/0179351 A1 | 8/2007 | Kil et al. |
| 2007/0206741 A1 | 9/2007 | Tiliks et al. |
| 2008/0052288 A1 | 2/2008 | Flinn et al. |
| 2008/0065759 A1 | 3/2008 | Gassewitz et al. |
| 2008/0104415 A1 | 5/2008 | Palti-Wasserman et al. |
| 2008/0148376 A1 | 6/2008 | Onozawa et al. |
| 2008/0170776 A1 | 7/2008 | Albertson et al. |
| 2008/0218472 A1 | 9/2008 | Breen et al. |
| 2008/0271143 A1 | 10/2008 | Stephens et al. |
| 2008/0313500 A1 | 12/2008 | Strauss et al. |
| 2009/0023422 A1 | 1/2009 | Macinnis et al. |
| 2009/0149247 A1 | 6/2009 | Esbensen et al. |
| 2009/0177626 A1 | 7/2009 | Lottero |
| 2009/0177979 A1 | 7/2009 | Garbow et al. |
| 2009/0199264 A1 | 8/2009 | Lang |
| 2009/0199296 A1 | 8/2009 | Xie et al. |
| 2009/0292659 A1 | 11/2009 | Jung et al. |
| 2009/0292743 A1 | 11/2009 | Bigus et al. |
| 2009/0293121 A1 | 11/2009 | Bigus et al. |
| 2010/0115610 A1 | 5/2010 | Tredoux et al. |
| 2010/0146622 A1 | 6/2010 | Nordstrom et al. |
| 2010/0205667 A1 | 8/2010 | Anderson et al. |
| 2010/0257580 A1 | 10/2010 | Zhao |
| 2010/0269175 A1 | 10/2010 | Stolfo et al. |
| 2010/0331146 A1 | 12/2010 | Kil |
| 2010/0332550 A1 | 12/2010 | Ainslie |
| 2011/0004520 A1 | 1/2011 | Chou et al. |
| 2011/0016534 A1 | 1/2011 | Jakobsson et al. |
| 2011/0022443 A1 | 1/2011 | Partridge et al. |
| 2011/0106829 A1 | 5/2011 | Pradhan et al. |
| 2011/0112970 A1 | 5/2011 | Yu |
| 2011/0138366 A1 | 6/2011 | Wintergerst et al. |
| 2011/0173084 A1 | 7/2011 | Cheng et al. |
| 2011/0185421 A1 | 7/2011 | Wittenstein et al. |
| 2011/0212770 A1 | 9/2011 | Ocko et al. |
| 2011/0221568 A1 | 9/2011 | Giobbi |
| 2011/0231770 A1 | 9/2011 | Tovar |
| 2011/0296003 A1 | 12/2011 | McCann et al. |
| 2011/0320816 A1 | 12/2011 | Yao et al. |
| 2012/0060219 A1 | 3/2012 | Larsson et al. |
| 2012/0079045 A1 | 3/2012 | Plotkin |
| 2012/0084349 A1 | 4/2012 | Lee et al. |
| 2012/0101970 A1 | 4/2012 | Zernik et al. |
| 2012/0131657 A1 | 5/2012 | Sunstein et al. |
| 2012/0137367 A1 | 5/2012 | Dupont et al. |
| 2012/0144468 A1 | 6/2012 | Pratt et al. |
| 2012/0185910 A1 | 7/2012 | Miettinen et al. |
| 2012/0258437 A1 | 10/2012 | Sadeh-Koniecpol et al. |
| 2012/0281885 A1 | 11/2012 | Syrdal et al. |
| 2012/0284776 A1 | 11/2012 | Sundaram et al. |
| 2012/0297477 A1 | 11/2012 | Raviv |
| 2013/0024239 A1 | 1/2013 | Baker et al. |
| 2013/0042327 A1 | 2/2013 | Chow |
| 2013/0044055 A1 | 2/2013 | Karmarkar et al. |
| 2013/0055348 A1 | 2/2013 | Strauss et al. |
| 2013/0055367 A1 | 2/2013 | Kshirsagar et al. |
| 2013/0072169 A1 | 3/2013 | Ross et al. |
| 2013/0086167 A1 | 4/2013 | Blom |
| 2013/0091088 A1 | 4/2013 | Forman et al. |
| 2013/0091539 A1 | 4/2013 | Khurana et al. |
| 2013/0097237 A1 | 4/2013 | Kothari et al. |
| 2013/0097701 A1 | 4/2013 | Moyle et al. |
| 2013/0111586 A1 | 5/2013 | Jackson |
| 2013/0117214 A1 | 5/2013 | Davis et al. |
| 2013/0124538 A1 | 5/2013 | Lee et al. |
| 2013/0133054 A1 | 5/2013 | Davis et al. |
| 2013/0142363 A1 | 6/2013 | Amento et al. |
| 2013/0151515 A1 | 6/2013 | Davis et al. |
| 2013/0191898 A1 | 7/2013 | Kraft |
| 2013/0238540 A1 | 9/2013 | O'Donoghue et al. |
| 2013/0252737 A1 | 9/2013 | Mescon et al. |
| 2013/0263206 A1 | 10/2013 | Nefedov et al. |
| 2013/0291099 A1 | 10/2013 | Donfried et al. |
| 2013/0303159 A1 | 11/2013 | Gathala et al. |
| 2013/0305357 A1 | 11/2013 | Ayyagari et al. |
| 2013/0305359 A1 | 11/2013 | Gathala et al. |
| 2013/0318199 A1 | 11/2013 | Le Jouan |
| 2014/0040309 A1 | 2/2014 | Meaney et al. |
| 2014/0040989 A1 | 2/2014 | Davis et al. |
| 2014/0052465 A1 | 2/2014 | Madan et al. |
| 2014/0053261 A1 | 2/2014 | Gupta et al. |
| 2014/0095419 A1 | 4/2014 | Gandhi et al. |
| 2014/0096215 A1 | 4/2014 | Hessler |
| 2014/0114899 A1 | 4/2014 | Wan et al. |
| 2014/0199663 A1 | 7/2014 | Sadeh-Koniecpol et al. |
| 2014/0207724 A1 | 7/2014 | Ledenev et al. |
| 2014/0282964 A1 | 9/2014 | Stubblefield et al. |
| 2014/0283016 A1 | 9/2014 | Sambamurthy et al. |

(56) References Cited

U.S. PATENT DOCUMENTS

| | | |
|---|---|---|
| 2014/0317081 A1 | 10/2014 | Dubois-Ferriere et al. |
| 2014/0317726 A1 | 10/2014 | Turgeman et al. |
| 2014/0317734 A1 | 10/2014 | Valencia et al. |
| 2014/0323106 A1 | 10/2014 | Nunally |
| 2014/0325223 A1 | 10/2014 | Turgeman et al. |
| 2014/0333415 A1 | 11/2014 | Kursun |
| 2014/0344015 A1 | 11/2014 | Puertolas-Montanes et al. |
| 2014/0347479 A1 | 11/2014 | Givon |
| 2015/0033305 A1 | 1/2015 | Shear et al. |
| 2015/0067845 A1 | 3/2015 | Chari et al. |
| 2015/0073920 A1 | 3/2015 | Pashkevich et al. |
| 2015/0082441 A1 | 3/2015 | Gathala et al. |
| 2015/0096002 A1 | 4/2015 | Shuart et al. |
| 2015/0106888 A1 | 4/2015 | Cheng et al. |
| 2015/0109104 A1 | 4/2015 | Fadell et al. |
| 2015/0118992 A1* | 4/2015 | Wyatt .................. H04W 12/08 455/410 |
| 2015/0128285 A1 | 5/2015 | LaFever et al. |
| 2015/0154494 A1 | 6/2015 | Medvedovsky et al. |
| 2015/0161386 A1 | 6/2015 | Gupta et al. |
| 2015/0180894 A1 | 6/2015 | Sadovsky et al. |
| 2015/0205944 A1 | 7/2015 | Turgeman |
| 2015/0205957 A1 | 7/2015 | Turgeman et al. |
| 2015/0205958 A1 | 7/2015 | Turgeman et al. |
| 2015/0206102 A1 | 7/2015 | Cama et al. |
| 2015/0213246 A1 | 7/2015 | Turgeman et al. |
| 2015/0220734 A1 | 8/2015 | Nalluri et al. |
| 2015/0242605 A1 | 8/2015 | Du et al. |
| 2015/0242621 A1 | 8/2015 | Jackson et al. |
| 2015/0244821 A1 | 8/2015 | Burger |
| 2015/0249718 A1 | 9/2015 | Huybregts et al. |
| 2015/0254467 A1 | 9/2015 | Leuthardt et al. |
| 2015/0310196 A1 | 10/2015 | Turgeman et al. |
| 2015/0324563 A1 | 11/2015 | Deutschmann et al. |
| 2015/0338917 A1 | 11/2015 | Steiner et al. |
| 2015/0339477 A1 | 11/2015 | Abrams et al. |
| 2015/0339673 A1 | 11/2015 | Adjaoute |
| 2015/0358317 A1 | 12/2015 | Deutschmann et al. |
| 2015/0363770 A1 | 12/2015 | Ronca et al. |
| 2016/0029221 A1 | 1/2016 | Suarez Garcia et al. |
| 2016/0110528 A1 | 4/2016 | Gupta et al. |
| 2016/0110551 A1 | 4/2016 | Fugate et al. |
| 2016/0117500 A1 | 4/2016 | Li et al. |
| 2016/0125176 A1 | 5/2016 | Scea et al. |
| 2016/0197904 A1 | 7/2016 | Taratine et al. |
| 2016/0197918 A1 | 7/2016 | Turgeman et al. |
| 2016/0203316 A1 | 7/2016 | Mace et al. |
| 2016/0210407 A1 | 7/2016 | Dwang et al. |
| 2016/0212172 A1 | 7/2016 | Senanayake et al. |
| 2016/0232352 A1 | 8/2016 | Chen et al. |
| 2016/0234184 A1 | 8/2016 | Liu et al. |
| 2016/0239857 A1 | 8/2016 | Milton et al. |
| 2016/0241579 A1 | 8/2016 | Roosenraad et al. |
| 2016/0294959 A1 | 10/2016 | Cho |
| 2016/0306844 A1 | 10/2016 | Frank et al. |
| 2016/0306974 A1 | 10/2016 | Turgeman et al. |
| 2016/0330217 A1 | 11/2016 | Gates |
| 2016/0337390 A1 | 11/2016 | Sridhara et al. |
| 2016/0337399 A1 | 11/2016 | Kamath et al. |
| 2016/0352760 A1 | 12/2016 | Mrkos et al. |
| 2017/0010665 A1 | 1/2017 | Tanaka et al. |
| 2017/0032248 A1 | 2/2017 | Dotan-Cohen et al. |
| 2017/0033932 A1 | 2/2017 | Truu et al. |
| 2017/0041148 A1 | 2/2017 | Pearce |
| 2017/0063886 A1 | 3/2017 | Muddu et al. |
| 2017/0076043 A1 | 3/2017 | Dormer et al. |
| 2017/0085587 A1 | 3/2017 | Turgeman |
| 2017/0091450 A1 | 3/2017 | Turgeman |
| 2017/0111506 A1 | 4/2017 | Strong et al. |
| 2017/0134412 A1 | 5/2017 | Cheng et al. |
| 2017/0140279 A1 | 5/2017 | Turgeman |
| 2017/0154366 A1 | 6/2017 | Turgeman |
| 2017/0161478 A1 | 6/2017 | Stavrou et al. |
| 2017/0161503 A1 | 6/2017 | Seigel et al. |
| 2017/0177683 A1 | 6/2017 | Koike et al. |
| 2017/0177884 A1 | 6/2017 | Mehta et al. |
| 2017/0180336 A1 | 6/2017 | Josephson et al. |
| 2017/0180407 A1 | 6/2017 | Zage et al. |
| 2017/0230391 A1 | 8/2017 | Ferguson et al. |
| 2017/0230417 A1 | 8/2017 | Amar et al. |
| 2017/0230418 A1 | 8/2017 | Amar et al. |
| 2017/0243223 A1 | 8/2017 | Kolotinsky et al. |
| 2017/0244718 A1 | 8/2017 | Andreeva et al. |
| 2017/0251008 A1 | 8/2017 | Andreeva et al. |
| 2017/0257358 A1 | 9/2017 | Ebrahimi et al. |
| 2017/0277996 A1 | 9/2017 | Vogel et al. |
| 2017/0279801 A1 | 9/2017 | Andrade |
| 2017/0286671 A1 | 10/2017 | Chari et al. |
| 2018/0007053 A1 | 1/2018 | Grant et al. |
| 2018/0013780 A1 | 1/2018 | Mao et al. |
| 2018/0018456 A1 | 1/2018 | Chen et al. |
| 2018/0034850 A1 | 2/2018 | Turgeman |
| 2018/0039990 A1 | 2/2018 | Lindemann |
| 2018/0060569 A1 | 3/2018 | Kim et al. |
| 2018/0077099 A1 | 3/2018 | Silva et al. |
| 2018/0077166 A1 | 3/2018 | Kovega |
| 2018/0121546 A1 | 5/2018 | Dingwall et al. |
| 2018/0144110 A1 | 5/2018 | Creamer et al. |
| 2018/0152403 A1 | 5/2018 | Charignon |
| 2018/0158165 A1 | 6/2018 | Hodge |
| 2018/0188916 A1 | 7/2018 | Lyons et al. |
| 2018/0219914 A1 | 8/2018 | Reith et al. |
| 2018/0240020 A1 | 8/2018 | Madaan et al. |
| 2018/0241761 A1 | 8/2018 | Bania et al. |
| 2018/0255080 A1 | 9/2018 | Paine |
| 2018/0256041 A1 | 9/2018 | Dormer et al. |
| 2018/0263545 A1 | 9/2018 | Camporesi et al. |
| 2018/0288161 A1 | 10/2018 | Saxena et al. |
| 2018/0310171 A1 | 10/2018 | Whitaker et al. |
| 2018/0349628 A1 | 12/2018 | Bender et al. |
| 2019/0044978 A1 | 2/2019 | Barday et al. |
| 2019/0121956 A1 | 4/2019 | Turgeman |
| 2019/0132344 A1 | 5/2019 | Lem et al. |
| 2019/0244212 A1 | 8/2019 | Zirnhelt |
| 2019/0260785 A1* | 8/2019 | Jenkinson ........... H04L 63/1483 |
| 2019/0295730 A1 | 9/2019 | Weldemariam et al. |
| 2019/0332807 A1* | 10/2019 | LaFever ............. H04L 63/0407 |
| 2019/0333054 A1 | 10/2019 | Cona et al. |
| 2019/0370854 A1 | 12/2019 | Gao et al. |
| 2020/0164886 A1* | 5/2020 | Dutta .................. G06F 21/6236 |
| 2021/0026985 A1* | 1/2021 | Rind .................. G06F 21/6254 |
| 2021/0067536 A1* | 3/2021 | Mylrea .................. G06F 16/27 |
| 2022/0100900 A1* | 3/2022 | Baldwin ............. G06F 21/6254 |

OTHER PUBLICATIONS

Guy Zyskind et al., Decentralizing Privacy: Using Blockchain to Protect Personal Data, 2015 IEEE CS Security and Privacy Workshops, pp. 180-184, http://inpluslab.sysu.edu.cn/files/Paper/Security/Decentralizing_Privacy_Using_Blockchain_To_Protect_Personal_Data.pdf.

Malek Ben Salem et al., A Survey of Insider Attack Detection Research, Insider Attack and Cyber Security: Beyond the Hacker, Springer, 2008 https://pdfs.semanticscholar.org/3135/eb4b37aa487dd5f06dfa178bbc1d874f3cdf.pdf.

Amos Azaria et al., Behavioral Analysis of Insider Threat: A Survey and Bootstrapped Prediction in Imbalanced Data, Journal of Latex Class Files, vol. 6, No. 1, Jan. 2007.

Mike Hintze et al., Comparing the Benefits of Pseudonymization and Anonymization Under the GDPR, Privacy Analytics, White Paper, 2017.

google.com, Phishing Prevention with Password Alert FAQ, printed Feb. 22, 2018.

* cited by examiner

RE-IDENTIFYING PSEUDONYMIZED OR DE-IDENTIFIED DATA UTILIZING DISTRIBUTED LEDGER TECHNOLOGY

BACKGROUND OF THE INVENTION

Field of the Invention

The present invention relates in general to the field of computers and similar technologies, and in particular to software utilized in this field. Still more particularly, it relates to a method, system and computer-usable medium for managing the re-identification of pseudonymized or de-identified data using distributed ledger technology.

Description of the Related Art

Users interact with physical, system, data, and services resources of all kinds, as well as each other, on a daily basis. Each of these interactions, whether accidental or intended, poses some degree of security risk, depending on the behavior of the user. In particular, the actions of a formerly trusted user may become malicious as a result of being subverted, compromised or radicalized due to any number of internal or external factors or stressors. For example, financial pressure, political idealism, irrational thoughts, or other influences may adversely affect a user's intent and/or behavior. Furthermore, users have information to be protected from tampering, such as personal information commonly referred to as personally identifiable information (PII) or personal data (PD). Such information can be included in an adaptive trust profile. Furthermore, the information can be stored as de-identified or anonymized information.

Data anonymization and data de-identification may be used in applications where data privacy is desired or required. Examples of applications include biometrics, social networks, surveillance, etc. Further, some regions, like the European Union, have stringent data privacy laws that impose stringent regulations for the protection of PD, and the use of data anonymization and/or data de-identification can be used to mitigate the impact of such regulations.

In general, data protection laws are based on the principle of transparency and an obligation to data subjects (i.e., persons) as to the collection, use, and disclosure of personal information. The General Data Protection Regulation (GDPR) established by the European Union implements a set of rules for data protection. Under the GDPR, specific rules as to data protection are provided for those that control (i.e., controllers) and those that process (i.e., processors). For example, controllers and/or their representatives shall maintain a record (i.e., documentation) of processing activities under their responsibility. Controllers must provide extensive details to data subjects whenever they process personal data. Processors and/or their representatives shall maintain a record (i.e., documentation) of all categories of processing activities that are performed on behalf of a controller. Such records are to be in writing, which can include electronic form.

Data anonymization and data de-identification can be considered as information sanitization. The data anonymization process can involve either encrypting or removing personally identifiable information from data sets, such that the people or entities whom the data describe remain anonymous. Data anonymization is often considered as a process in which personal data is irreversibly altered such that that data can no longer be identified directly or indirectly to the individual.

Data de-identification, like data anonymization, is also a process used to prevent a person's identity from being connected with data. Data anonymization is considered a "stronger" version of data de-identification, since as discussed above, data that is anonymized cannot be re-identified back to a person or entity. In certain instances, it is desirable to be able to protect the identity of a person or entity in connection with data during particular instances; however, there may be a need to be able to reconnect the person or entity to the data in other or future instances. Therefore, a data de-identification process can be implemented.

Pseudonymization is a technique that can be implemented for data de-identification. Pseudonymization provides that personal data can no longer be attributed to a specific data subject without the use of additional information. That additional information should be kept separately and subject to organizational security measures to assure the privacy of the individual or entity.

Re-identification is the reverse process of using de-identified data to identify individuals or entities. It is also the reversal of pseudonymization. In reversing the de-identification process, several issues arise. In certain instances, individuals may have requested that the personal data about them be deleted, where such right can be a right to erasure or the right to be forgotten. Whenever re-identification occurs, it is important that there is accountability or a record as to re-identifying the de-identified or pseudonymized data.

Under regulations providing for protection of personal data, such as the GDPR, certain obligations are to be met. Since fully anonymized data no longer becomes "personal data," anonymized data is not subject to such obligations. However, certain GDPR obligations apply when de-identification or pseudonymization processes are reversed and personal data is identifiable to an individual. Examples of obligations under the GDPR include "give right to erasure/right to be forgotten", "other data subject rights (access, portability, etc.)", "basis for cross-border transfers; data protection by design", "data security; data breach notification", "data retention limitations", "documentation/record keeping obligations", and "vendor/sub-processor management". However, if the personal data is anonymized, certain of these obligations may no longer be required. Since pseudonymization allows for the possibility of being re-identified, in instances where personal data is pseudonymized, some of the obligations may still be applicable. For example, the GDPR obligations "give right to erasure/right to be forgotten" and "other data subject rights (access, portability, etc.)" depending on the strength and nature of the pseudonymization. Under regulatory regimes such as GDPR, it may be desirable or even required to keep records of compliance.

Distributed ledger technology (DLT) is one type of digital system for recording information. However, unlike traditional databases, distributed ledgers have no central data store or repository. Distributed ledger technology (DLT) and distributed ledgers can be distributed widely in a controlled manner. DLT can be efficient since changes to the distributed ledger by any participant with the necessary permission to modify the distributed ledger are immediately reflected in all copies of the distributed ledger. Examples of DLT include but are not limited to block chain, hashgraph, block directed acyclic graphs (blockDAG), and transaction based directed acyclic graphs (TDAG).

SUMMARY OF THE INVENTION

A method, system and computer-usable medium for providing auditability of a distributed ledger technology (DLT)

of de-identified data of entities, stored in the DLT. In certain embodiments, data related to an entity is de-identified. The de-identified data is stored in the DLT. Access to the de-identified data is determined. Instances of access to the de-identified data are recorded to the DLT. In certain embodiments, information used to re-identify the de-identified data is store on the DLT. Access to the information can also be determined and recorded to the DLT.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
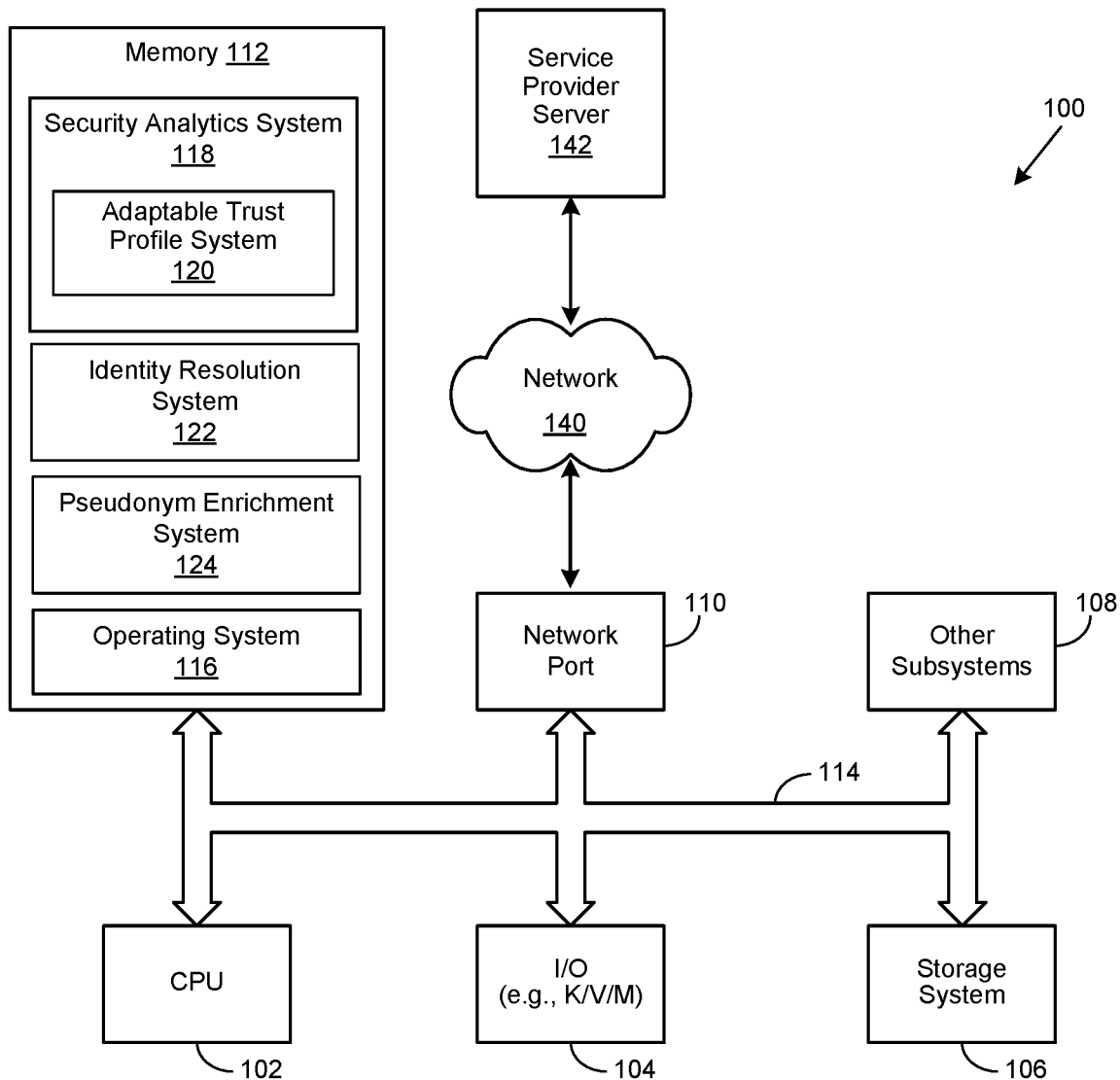
FIG. 1 depicts an exemplary client computer in which the present invention may be implemented.

A method, system and computer-usable medium are disclosed for using entity profile attributes to adaptively mitigate risk. Certain aspects of the invention include an appreciation that the existence of an entity, represents some degree of security risk. Various aspects of the invention likewise include an appreciation that certain non-user entities, such as computing, communication, and surveillance devices can be a source for telemetry associated with certain events and entity behaviors. Likewise, various aspects of the invention include an appreciation that certain accounts may be global, spanning multiple devices, such as a domain-level account allowing an entity access to multiple systems. Certain aspects of the invention likewise include an appreciation that a particular account may be shared by multiple entities.

As likewise used herein, an entity broadly refers to something that exists as itself, whether physically or abstractly. In certain embodiments, an entity may be an individual user, a group, an organization, or a government. In certain embodiments, an entity may likewise be an item, a device, such as endpoint and edge devices, a network, a domain, an operation, or a process. In certain embodiments, an entity may be a resource, such as a geographical location or formation, a physical facility, a venue, a system, a data store, or a service, such as a service operating in a cloud environment.

Certain embodiments of the invention likewise reflect an appreciation that being able to resolve the identity of an entity prior to the next step of such a process being performed may assist in mitigating risk corresponding to certain user behavior associated with a particular event. Furthermore, certain embodiments of the invention likewise reflect an appreciation that known approaches to resolving the identity of multiple entities at a latter point in time, such as batch mode processing, are typically unable to resolve the identity of an entity prior to the performance of the next step of such processes.

Certain embodiments of the invention likewise reflect an appreciation that data or information associated with entities is masked, hidden and/or obfuscated by de-identification or pseudonymizing, and reidentified with an auditability using a distributed ledger technology (which may also be called a shared ledger or distributed ledger), such as block chain, hashgraph, block directed acyclic graphs (blockDAG), transaction based directed acyclic graphs (TDAG), or the like.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a security analytics system 118. In one embodiment, the information handling system 100 is able to download the security analytics system 118 from the service provider server 142. In another embodiment, the security analytics system 118 is provided as a cloud service from the service provider server 142.

In various embodiments, the security analytics system 118 performs a security analytics operation. In certain embodiments, the security analytics operation improves processor efficiency, and thus the efficiency of the information handling system 100, by facilitating security analytics functions. As will be appreciated, once the information handling system 100 is configured to perform the security analytics operation, the information handling system 100 becomes a specialized computing device specifically configured to perform the security analytics operation and is not a general-purpose computing device. Moreover, the implementation of the security analytics system 118 on the information handling system 100 improves the functionality of the information handling system 100 and provides a useful and concrete result of performing security analytics functions to mitigate security risk. In certain embodiments, the security analytics system 118 may be implemented to include an adaptable trust profile (ATP) system 120. In certain embodiments, the ATP system 120 may be implemented to perform various ATP operations, described in greater detail herein.

In an embodiment, the system memory 112 includes an identity resolution system 122. In one embodiment, the information handling system 100 is able to download the identity resolution system 122 from the service provider server 142. In another embodiment, the identity resolution system 122 is provided as a service from the service provider server 142. In various embodiments, the identity resolution system 122 performs one or more operations for providing real-time resolution of the identity of an entity at a particular point in time. In certain embodiments, the real-time resolution of the identity of an entity at a particular point in time improves processor efficiency, and thus the efficiency of the information handling system 100, by automating the providing real-time resolution of the identity of an entity at a particular point in time. As will be appreciated, once the information handling system 100 is configured to provide real-time resolution of the identity of an entity at a particular point in time, the information handling system 100 becomes a specialized computing device specifically configured to provide real-time resolution of the identity of an entity at a particular point in time and is not a general purpose computing device. Moreover, the implementation of the identity resolution system 122 on the information handling system 100 improves the functionality of the information handling system 100 and provides a useful and concrete result of automating the real-time resolution of the identity of an entity at a particular point in time.

In an embodiment, the system memory 112 includes a pseudonym enrichment system 124. In one embodiment, the information handling system 100 is able to download the pseudonym enrichment system 124 from the service provider server 142. In another embodiment, the pseudonym enrichment system 124 is provided as services from the service provider server 142. In various embodiments, the pseudonym enrichment system 124 provides a manner of identifying entities in certain events by substituting pseudonyms for entity names in received events.

Figure 2:
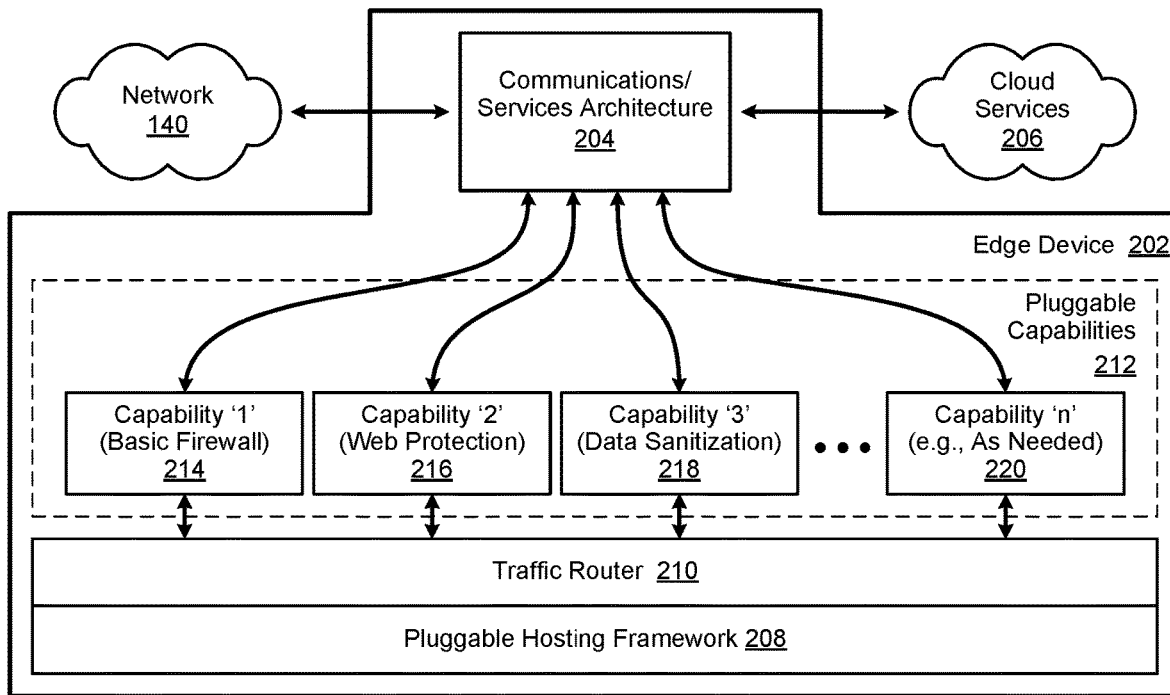
FIG. 2 is a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances, and a cybersecurity system or part of a cybersecurity system. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis. In certain embodiments, such capabilities may include the performance of operations associated with managing an adaptive trust profile (ATP), described in greater detail herein. In certain embodiments, such operations may include the provision of associated temporal information (e.g., time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

In certain embodiments, the edge device 202 may provide contextual information, including events, to the pseudonym enrichment system 124. In certain embodiments, the pseudonym enrichment system 124 determines whether the information provided by the edge device 202 includes an entity name. In certain embodiments, the pseudonym enrichment system 124 determines whether the entity name has a corresponding pseudonym and images the event with the pseudonym name corresponding to the entity name. In certain embodiments, the pseudonymized information is provided to the security analytics 118 which, in turn, analyzes the pseudonymized information so as to maintain the anonymity of the entity. In certain embodiments, the edge device 202 makes a determination as to whether the received events include entity names and passes only those events having entity names directly to the pseudonym enrichment system 124 thereby bypassing the security analytics 118 for such events. In certain embodiments, the pseudonym enrichment system 124 provides pseudonymized events to the security analytics 118. In certain embodiments, events that do not include an entity name are passed directly from the edge device 202 to the security analytics 118.

In certain embodiments, the edge device 202 may be configured to pass all events to the pseudonym enrichment system 124 before they are passed to the security analytics 118. In such instances, the edge device 202 routes all events directly to the pseudonym enrichment system 122 before passing the masked events to security analytics 118. In certain embodiments, the edge device 202 accepts a stream of raw events and generates a plurality of resolved events for consumption by the pseudonym enrichment system 124. As used herein, a resolved event is an event that includes an entity name and its corresponding event information, such as event type, event time, feature, etc. In certain embodiments, the pseudonym enrichment system 124 makes the determination as to whether the raw events are to be associated with entity names and, if so, resolves the event with the corresponding entity name. In certain embodiments, the pseudonym enrichment system pseudonymizes the events as needed. In certain embodiments, events that do not include entity names as well as events not needing pseudonymization are also passed from the edge device 202 through the pseudonym enrichment system 124.

In certain embodiments, the edge device 202, for example through the pluggable capabilities 212 can be configured to de-identify an event stream comprising one or more events associated with an individual; send the de-identified event stream to a cloud service for security analysis; the cloud service requesting reidentification information from the customer; upon receiving the reidentification information, use the reidentification information to perform a re-identification operation on at least a portion of the de-identified event stream; and store a record of the re-identification operation in a distributed ledger. In other embodiments, upon a trigger by the security analysis, the edge device 202, not the cloud service, can perform a reidentification operation. The record of the reidentification can be stored up in the cloud service using distributed ledger.

Figure 3:
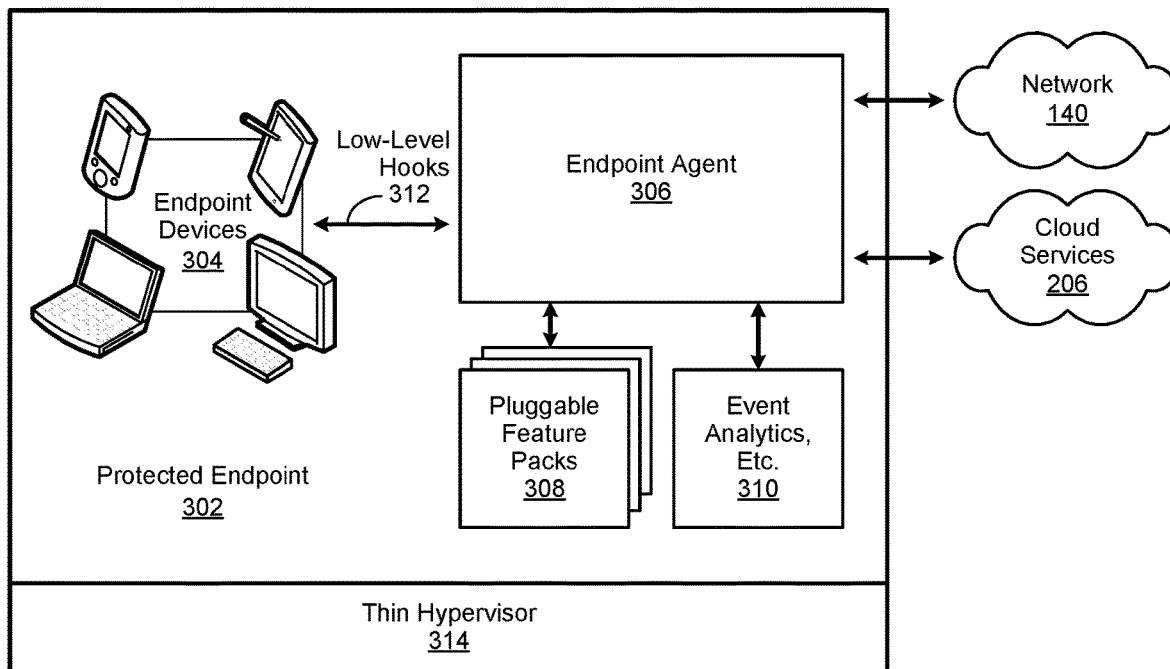
FIG. 3 is a simplified block diagram of an endpoint agent.

FIG. 3 is a simplified block diagram of an endpoint agent implemented in accordance with an embodiment of the invention. As used herein, an endpoint agent 306 broadly refers to a software agent used in combination with a user or an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed entity behavior.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device capable of storing, processing and communicating data. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 304 when it is offline. In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with certain criteria before they are granted access to network resources. As an example, a given endpoint device 304 may be required to have a particular operating system (OS), or version thereof, a Virtual Private Network (VPN) client, anti-virus software with current updates, and so forth. In certain embodiments, the protected endpoint 302 may be implemented to perform operations associated with providing real-time resolution of the identity of an entity at a particular point in time, as described in greater detail herein.

In certain embodiments, the protected endpoint 302 may be implemented to provide temporal information, such as time-stamp information, associated with such operations.

In certain embodiments, the real-time resolution of the identity of an entity at a particular point in time may be based upon contextual information associated with a given entity behavior. As used herein, contextual information broadly refers to any information, directly or indirectly, individually or in combination, related to a particular entity behavior. In certain embodiments, entity behavior may include an entity's physical behavior, cyber behavior, or a combination thereof. As likewise used herein, physical behavior broadly refers to any entity behavior occurring within a physical realm. More particularly, physical behavior may include any action enacted by an entity that can be objectively observed, or indirectly inferred, within a physical realm.

In certain embodiments, the entity may be a user, an endpoint device 304, or various resources, described in greater detail herein. In certain embodiments, the entities may include various endpoint devices 304 or resources operating at the behest of an entity, such as a user. In certain embodiments, the communication between the entities may include audio, image, video, text, or binary data.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically observable entity behavior broadly refers to any behavior exhibited or enacted by an entity that can be electronically observed.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

As likewise used herein, cyberspace broadly refers to a network 140 environment capable of supporting communication between two or more entities. In certain embodiments, the entity may be a user, an endpoint device 304, or various resources, described in greater detail herein. In certain embodiments, the entities may include various endpoint devices 304 or resources operating at the behest of an entity, such as a user. In certain embodiments, the communication between the entities may include audio, image, video, text, or binary data.

As described in greater detail herein, the contextual information may include a user's authentication factors. Contextual information may likewise include various temporal identity resolution factors, such as identification factors associated with the entity, the date/time/frequency of various entity behaviors, the entity's location, the entity's role or position in an organization, their associated access rights, and certain entity gestures employed by an entity in the enactment of an entity behavior. Other contextual information may likewise include various user interactions, whether the interactions are with an endpoint device 304, a network 140, a resource, or another user. In certain embodiments, entity behaviors, and their related contextual information, may be collected at particular points of observation, and at particular points in time, described in greater detail herein. In certain embodiments, a protected endpoint 302 may be implemented as a point of observation for the collection of entity behavior and contextual information.

In certain embodiments, the endpoint agent 306 may be implemented to universally support a variety of operating systems, such as Apple MacOS®, Microsoft Windows®, Linux®, Android® and so forth. In certain embodiments, the endpoint agent 306 may be implemented to interact with the endpoint device 304 through the use of low-level hooks 312 at the operating system (OS) level. It will be appreciated that the use of low-level hooks 312 allows the endpoint agent 306 to subscribe to multiple events through a single hook. Consequently, multiple functionalities provided by the endpoint agent 306 can share a single data stream, using only those portions of the data stream they may individually need. Accordingly, system efficiency can be improved, and operational overhead reduced.

In certain embodiments, the endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data loss protection (DLP), insider threat detection, and so forth. In certain embodiments, the security management functionalities may include one or more functionalities associated with providing real-time resolution of the identity of an entity at a particular point in time, as described in greater detail herein.

In certain embodiments, a particular pluggable feature pack 308 is invoked as needed by the endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 are invoked by the endpoint agent 306 according to the occurrence of a particular user behavior. In certain embodiments, the individual features of a pluggable feature pack 308 are invoked by the endpoint agent 306 according to the occurrence of a particular temporal event, described in greater detail herein. In certain embodiments, the individual features of a pluggable feature pack 308 are invoked by the endpoint agent 306 at a particular point in time. In these embodiments, the method by which a given user behavior, temporal event, or point in time is selected is a matter of design choice.

In certain embodiments, the individual features of a pluggable feature pack 308 may be invoked by the endpoint agent 306 according to the context of a particular user behavior. As an example, the context may be the user enacting the user behavior, their associated risk classification, which resource they may be requesting, the point in time the user behavior is enacted, and so forth. In certain embodiments, the pluggable feature packs 308 may be sourced from various cloud services 206. In certain embodiments, the pluggable feature packs 308 may be dynamically sourced from various cloud services 206 by the endpoint agent 306 on an as-need basis.

In certain embodiments, the endpoint agent 306 may be implemented with additional functionalities, such as event analytics 310. In certain embodiments, the event analytics 310 functionality may include analysis of various user behaviors, described in greater detail herein. In certain embodiments, the endpoint agent 306 may be implemented with a thin hypervisor 314, which can be run at Ring −1, thereby providing protection for the endpoint agent 306 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 4:
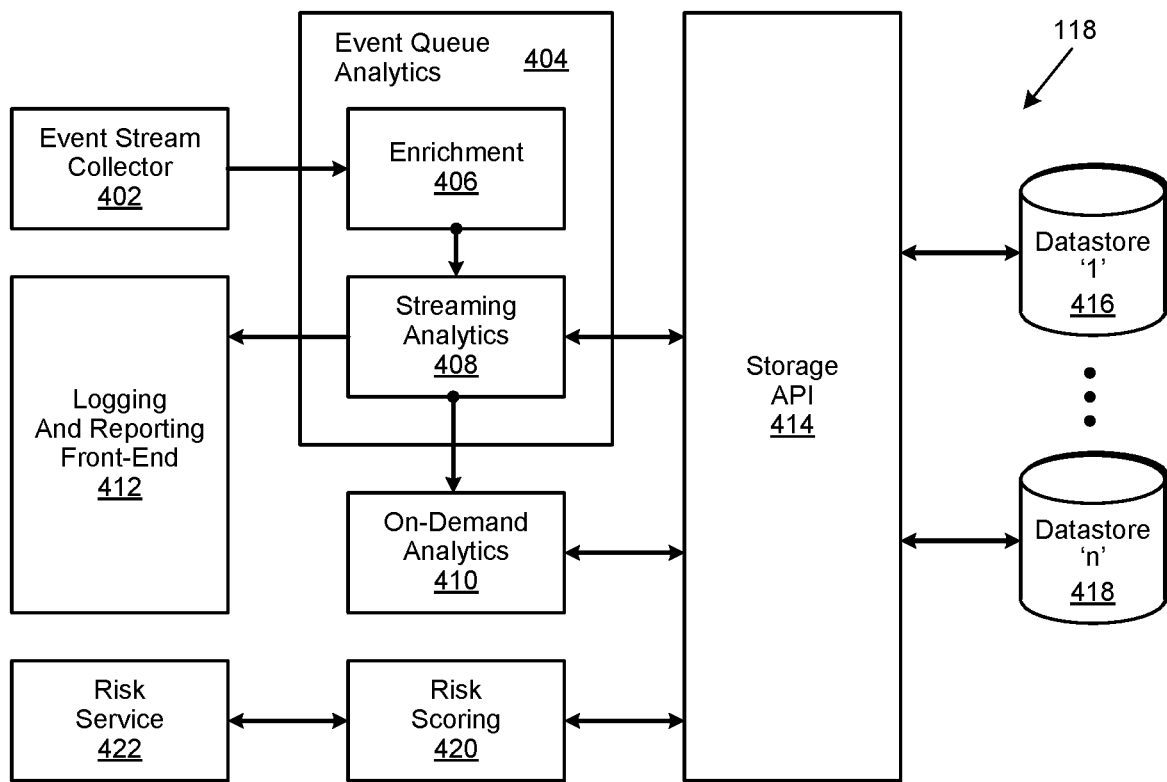
FIG. 4 is a simplified block diagram of a security analytics system.

FIG. 4 is a simplified block diagram of a security analytics system implemented in accordance with an embodiment of the invention. In certain embodiments, the security analytics system 118 shown in FIG. 4 may include an event queue analytics 404 module, described in greater detail herein. In certain embodiments, the event queue analytics 404 subsystem may be implemented to include an enrichment 406 module and streaming analytics 408 module. In certain embodiments, the security analytics system 118 may be implemented to provide log storage, reporting, and analytics capable of performing streaming 408 and on-demand 410 analytics operations. In certain embodiments, such operations may be associated with defining and managing an adaptive trust profile (ATP), detecting entity behavior that may be of analytic utility, adaptively responding to mitigate risk, or a combination thereof, as described in greater detail herein. In certain embodiments, entity behavior of analytic utility may be determined to be anomalous, abnormal, unexpected, malicious, or some combination thereof, as described in greater detail herein.

In certain embodiments, the security analytics system 118 may be implemented to provide a uniform platform for storing events and contextual information associated with various entity behaviors and performing longitudinal analytics. As used herein, longitudinal analytics broadly refers to performing analytics of entity behaviors occurring over a particular period of time. As an example, an entity may iteratively attempt to access certain proprietary information stored in various locations. In addition, the attempts may occur over a brief period of time. To continue the example, the fact that the information the entity is attempting to access is proprietary, that it is stored in various locations, and the attempts are occurring in a brief period of time, in combination, may indicate the entity behavior enacted by the entity is suspicious. As another example, certain entity identifier information (e.g., a username) associated with an entity may change over time. In this example, a change in the entity's username, during a particular period of time or at a particular point in time, may represent suspicious entity behavior.

In certain embodiments, the security analytics system 118 may be implemented to be scalable. In certain embodiments, the security analytics system 118 may be implemented in a centralized location, such as a corporate data center. In these embodiments, additional resources may be added to the security analytics system 118 as needs grow. In certain embodiments, the security analytics system 118 may be implemented as a distributed system. In these embodiments, the security analytics system 118 may span multiple information handling systems. In certain embodiments, the security analytics system 118 may be implemented in a cloud environment. In certain embodiments, the security analytics system 118 may be implemented in a virtual machine (VM) environment. In such embodiments, the VM environment may be configured to dynamically and seamlessly scale the security analytics system 118 as needed. Skilled practitioners of the art will recognize that many such embodiments are possible. Accordingly, the foregoing is not intended to limit the spirit, scope or intent of the invention.

In certain embodiments, an event stream collector 402 may be implemented to collect event and related contextual information, described in greater detail herein, associated with various entity behaviors. In these embodiments, the method by which the event and contextual information is selected to be collected by the event stream collector 402 is a matter of design choice. In certain embodiments, the event and contextual information collected by the event stream collector 402 may be processed by an enrichment module 406 to generate enriched entity behavior information. In certain embodiments, the enrichment may include certain contextual information related to a particular entity behavior or event. In certain embodiments, the enrichment may include certain temporal information, such as timestamp information, related to a particular entity behavior or event.

In certain embodiments, enriched entity behavior information may be provided by the enrichment module 406 to a streaming 408 analytics module. In turn, the streaming 408 analytics module may provide some or all of the enriched entity behavior information to an on-demand 410 analytics module. As used herein, streaming 408 analytics broadly refers to analytics performed in near real-time on enriched entity behavior information as it is received. Likewise, on-demand 410 analytics broadly refers herein to analytics performed, as they are requested, on enriched entity behavior information after it has been received. In certain embodiments, the enriched entity behavior information may be associated with a particular event. In certain embodiments, the enrichment 406 and streaming analytics 408 modules may be implemented to perform event queue analytics 404 operations, as described in greater detail herein.

In certain embodiments, the on-demand 410 analytics may be performed on enriched entity behavior associated with a particular interval of, or point in, time. In certain embodiments, the streaming 408 or on-demand 410 analytics may be performed on enriched entity behavior associated with a particular user, group of users, one or more non-user entities, or a combination thereof. In certain embodiments, the streaming 408 or on-demand 410 analytics may be performed on enriched entity behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 408 or on-demand 410 analytics modules may be provided to a storage Application Program Interface (API) 414. In turn, the storage API 412 may be implemented to provide access to various datastores '1' 416 through 'n' 418, which in turn are used to store the results of the analytics operations. In certain embodiments, the security analytics system 118 may be implemented with a logging and reporting front-end 412, which is used to receive the results of analytics operations performed by the streaming 408 analytics module. In certain embodiments, the datastores '1' 416 through 'n' 418 may variously include a datastore of entity identifiers, temporal events, or a combination thereof.

In certain embodiments, the security analytics system 118 may include a risk scoring 420 module implemented to perform risk scoring operations, described in greater detail herein. In certain embodiments, functionalities of the risk scoring 420 module may be provided in the form of a risk management service 422. In certain embodiments, the risk management service 422 may be implemented to perform operations associated with defining and managing an adaptive trust profile (ATP), as described in greater detail herein. In certain embodiments, the risk management service 422 may be implemented to perform operations associated with detecting entity behavior that may be of analytic utility and adaptively responding to mitigate risk, as described in greater detail herein. In certain embodiments, the risk management service 422 may be implemented to provide the results of various analytics operations performed by the streaming 406 or on-demand 408 analytics modules. In certain embodiments, the risk management service 422 may be implemented to use the storage API 412 to access various enhanced cyber behavior and analytics information stored on the datastores '1' 414 through 'n' 416. Skilled practitioners of the art will recognize that many such embodiments are possible. Accordingly, the foregoing is not intended to limit the spirit, scope or intent of the invention.

Figure 5:
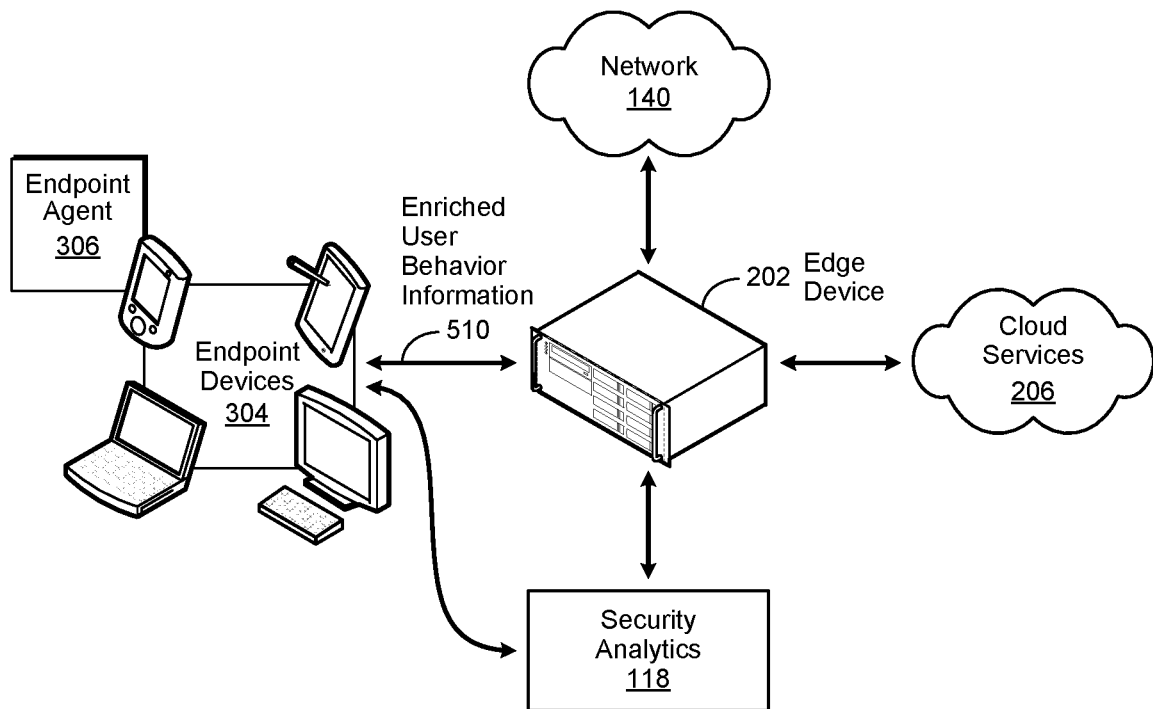
FIG. 5 is a simplified block diagram of a security analytics system.

FIG. 5 is a simplified block diagram of the operation of a security analytics system implemented in accordance with an embodiment of the invention. In certain embodiments, the security analytics system 118 may be implemented to perform operations associated with detecting entity behavior that may be of analytic utility, as described in greater detail herein. In certain embodiments, the security analytics system 118 may be implemented in combination with one or more endpoint agents 306, one or more edge devices 202, various cloud services 206, and a network 140 to perform such operations.

In certain embodiments, the network edge device 202 may be implemented in a bridge, a firewall, or a passive monitoring configuration. In certain embodiments, the edge device 202 may be implemented as software running on an information handling system. In certain embodiments, the network edge device 202 may be implemented to provide integrated logging, updating and control. In certain embodiments, the edge device 202 may be implemented to receive network requests and context-sensitive user behavior information in the form of enriched user behavior information 510, described in greater detail herein, from an endpoint agent 306, likewise described in greater detail herein.

In certain embodiments, the security analytics system 118 may be implemented as both a source and a sink of user behavior information. In certain embodiments, the security analytics system 118 may be implemented to serve requests for user/resource risk data. In certain embodiments, the edge device 202 and the endpoint agent 306, individually or in combination, may provide certain entity behavior information to the security analytics system 118 using either push or pull approaches familiar to skilled practitioners of the art.

As described in greater detail herein, the edge device 202 may be implemented in certain embodiments to receive enriched user behavior information 510 from the endpoint agent 306. It will be appreciated that such enriched user behavior information 510 will likely not be available for provision to the edge device 202 when an endpoint agent 306 is not implemented for a corresponding endpoint device 304. However, the lack of such enriched user behavior information 510 may be accommodated in various embodiments, albeit with reduced functionality related to operations associated with defining and managing an entity profile, detecting entity behavior that may be normal or of analytic utility, mitigating associated risk, or a combination thereof.

In certain embodiments, a given user behavior may be enriched by an associated endpoint agent 306 attaching contextual information to a request. In certain embodiments, the context is embedded within a network request, which is then provided as enriched user behavior information 510. In certain embodiments, the contextual information may be concatenated, or appended, to a request, which in turn may be provided as enriched user behavior information 510. In these embodiments, the enriched user behavior information 510 may be unpacked upon receipt and parsed to separate the request and its associated contextual information. Certain embodiments of the invention reflect an appreciation that one possible disadvantage of such an approach is that it may perturb certain Intrusion Detection System and/or Intrusion Detection Prevention (IDS/IDP) systems implemented on a network 140.

In certain embodiments, new flow requests may be accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores associated with a particular event on a per-user basis may be requested. In certain embodiments, the service may be requested from the security analytics system 118. In certain embodiments, the service may be requested from various cloud services 206.

In certain embodiments, contextual information associated with a particular entity behavior may be attached to various network service requests. In certain embodiments, the request may be wrapped and then handled by proxy. In certain embodiments, a small packet of contextual information associated with an entity behavior may be sent with a service request. In certain embodiments, service requests may be related to Domain Name Service (DNS), web browsing activity, email, and so forth, all of which are essentially requests for service by an endpoint device 304. In certain embodiments, such service requests may be associated with temporal event information, described in greater detail herein. Consequently, such requests can be enriched by the addition of entity behavior contextual information (e.g., UserAccount, interactive/automated, data-touched, temporal event information, etc.). Accordingly, the edge device 202 can then use this information to manage the appropriate response to submitted requests.

In certain embodiments, the security analytics system 118 may be implemented in different operational configurations. In certain embodiments, the security analytics system 118 may be implemented by using the endpoint agent 306. In certain embodiments, the security analytics system 118 may be implemented by using endpoint agent 306 in combination with the edge device 202. In certain embodiments, the cloud services 206 may likewise be implemented for use by the endpoint agent 306, the edge device 202, and the security analytics system 118, individually or in combination. In these embodiments, the security analytics system 118 may be primarily oriented to performing risk assessment operations related to entity actions, software program actions, data accesses, or a combination thereof. In certain embodiments, software program actions may be treated as a proxy for the entity.

In certain embodiments, the endpoint agent 306 may be implemented to update the security analytics system 118 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 118 may be implemented to access risk scores associated with the same user account but accrued on different endpoint devices 304. It will be appreciated that such an approach may prove advantageous when an adversary is "moving sideways" through a network environment, using different endpoint devices 304 to collect information.

In certain embodiments, the security analytics system 118 may be primarily oriented to applying risk mitigations in a way that maximizes security effort return-on-investment (ROI). In certain embodiments, this approach may be accomplished by providing additional contextual and entity behavior information associated with entity requests. As an example, a web gateway may not concern itself with why a particular file is being requested by a certain entity at a particular point in time. Accordingly, if the file cannot be identified as malicious or harmless, there is no context available to determine how, or if, to proceed. To extend the example, the edge device 202 and security analytics system 118 may be coupled such that requests can be contextualized and fitted into a framework that evaluates their associated risk. Certain embodiments of the invention reflect an appreciation that such an approach works well with web-based data loss protection (DLP) approaches, as each transfer is no longer examined in isolation, but in the broader context of an identified entity's actions, at a particular time, on the network 140.

As another example, the security analytics system 118 may be implemented to perform risk scoring processes to decide whether to block or allow unusual flows. In various embodiments, the risk scoring processes may be implemented to include certain aspects of eXtensible Access Control Markup Language (XACML) approaches known to skilled practitioners of the art. In certain embodiments, XACML obligations may be implemented to block or allow unusual flows. In certain embodiments, an XACML obligation may be implemented as a directive from a policy decision point (PDP) to a policy enforcement point (PEP) regarding what must be performed before or after a flow is approved. Certain embodiments of the invention reflect an appreciation that such an approach is highly applicable to defending against point-of-sale (POS) malware, a breach technique that has become increasingly more common in recent years. Certain embodiments of the invention likewise reflect an appreciation that while various edge device 202 implementations may not stop all such exfiltrations, they may be able to complicate the task for the attacker.

In certain embodiments, the security analytics system 118 may be primarily oriented to maximally leverage contextual information associated with various entity behaviors within the system. In certain embodiments, data flow tracking is performed by one or more endpoint agents 306, which allows the quantity and type of information associated with particular hosts to be measured. In turn, this information may be used to determine how the edge device 202 handles requests. By contextualizing such entity behavior on the network 140, the security analytics system 118 can provide intelligent protection, making decisions that make sense in the broader context of an organization's activities. Certain embodiments of the invention reflect an appreciation that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 6:
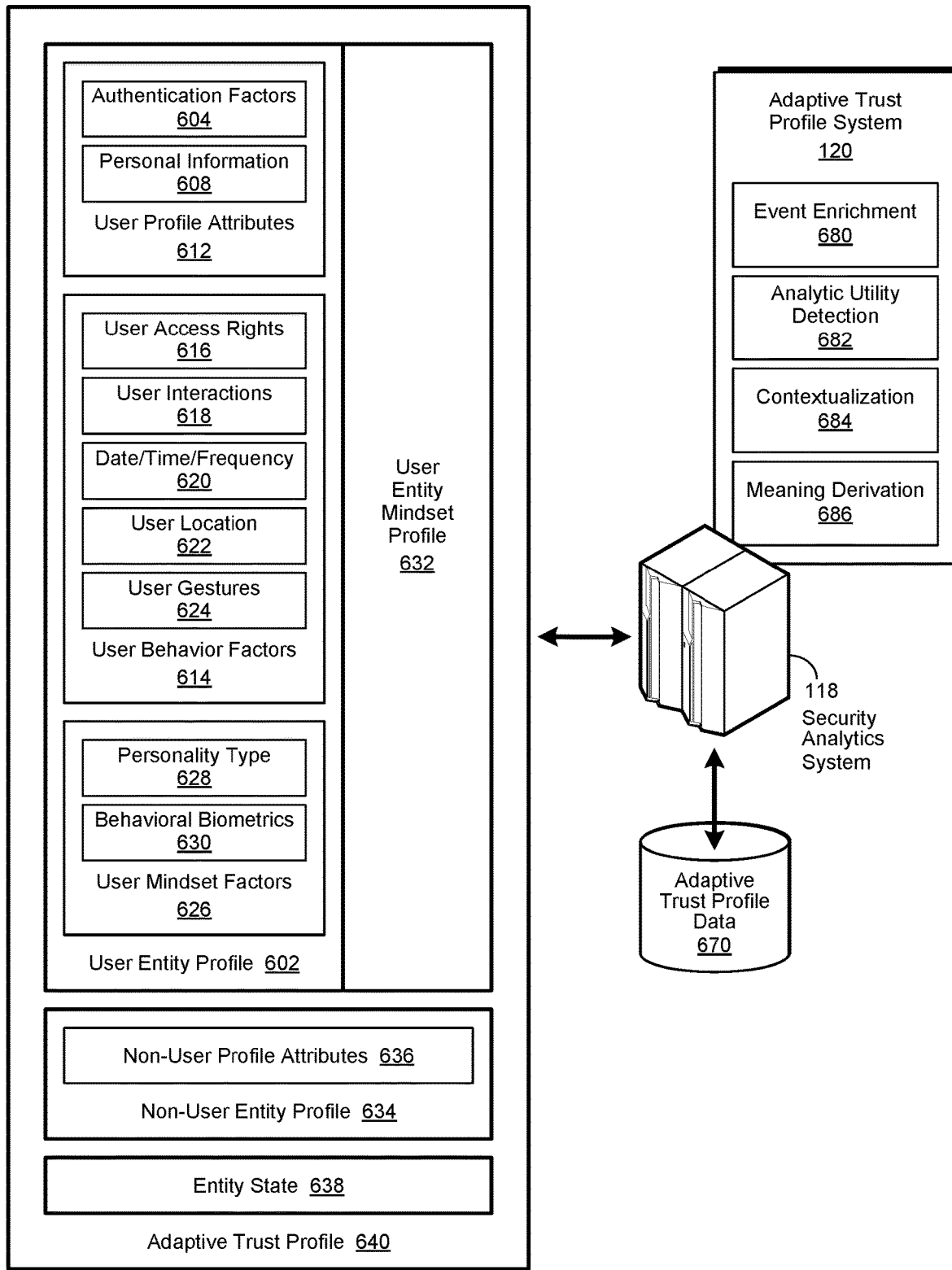
FIG. 6 is a simplified block diagram of an adaptive trust profile (ATP)

FIG. 6 is a simplified block diagram of an adaptive trust profile implemented in accordance with an embodiment of the invention. As used herein, an adaptive trust profile (ATP) 640 broadly refers to a collection of information that uniquely describes an entity's identity and their associated behavior, whether the behavior occurs within a physical realm or cyberspace. In certain embodiments, an ATP may be used to adaptively draw inferences regarding the trustworthiness of an entity. In certain embodiments, as described in greater detail herein, the drawing of the inferences may involve comparing a new entity behavior to known past behaviors enacted by the entity. In certain embodiments, new entity behavior of analytic utility may represent entity behavior that represents a security risk. As likewise used herein, an entity broadly refers to something that exists as itself, whether physically or abstractly. In certain embodiments, an entity may be a user entity, a non-user entity, or a combination thereof. In certain embodiments, the identity of an entity may be known or unknown.

As used herein, a user entity broadly refers to an entity capable of enacting a user behavior, as described in greater detail herein. Examples of a user entity include an individual person, a group of people, an organization, or a government. As likewise used herein, a non-user entity broadly refers to an entity whose identity can be described and may exhibit certain behavior but is incapable of enacting a user behavior. Examples of a non-user entity include an item, a device, such as endpoint and edge devices, a network, an account, a domain, an operation, and a process. Other examples of a non-user entity include a resource, such as a geographical location or formation, a physical facility, a venue, a system, a software application, a data store, and a service, such as a service operating in a cloud environment.

Certain embodiments of the invention reflect an appreciation that being able to uniquely identity a device may assist in establishing whether or not a particular login is legitimate. As an example, user impersonations may not occur at the user's endpoint, but rather, from another device or system. Certain embodiments of the invention likewise reflect an appreciation that profiling the behavior of a particular device or system may assist in determining whether or not it is acting suspiciously.

In certain embodiments, an account may be local account, which runs on a single machine. In certain embodiments, an account may be a global account, providing access to multiple resources. In certain embodiments, a process may be implemented to run in an unattended mode, such as when backing up files or checking for software updates. Certain embodiments of the invention reflect an appreciation that it is often advantageous to track events at the process level as a method of determining which events are associated with background processes and which are initiated by a user entity.

In certain embodiments, an ATP 640 may be implemented to include a user entity profile 602, an associated user entity mindset profile 632, a non-user entity profile 634, and an entity state 638. As used herein, a user entity profile 602 broadly refers to a collection of information that uniquely describes a user entity's identity and their associated behavior, whether the behavior occurs within a physical realm or cyberspace. In certain embodiments, as described in greater detail herein, the user entity profile 602 may include user profile attributes 612, user behavior factors 614, user mindset factors 626, or a combination thereof. In certain embodiments, the user profile attributes 612 may include certain user authentication factors 604, described in greater detail herein, and personal information 608.

As used herein, a user profile attribute 612 broadly refers to data or metadata that can be used, individually or in combination with other user profile attributes 612, user behavior factors 614, or user mindset factors 626, to ascertain the identity of a user entity. In various embodiments, certain user profile attributes 612 may be uniquely associated with a particular user entity. In certain embodiments, the personal information 608 may include non-sensitive personal information associated with a user entity, such as their name, title, position, role, and responsibilities. In certain embodiments, the personal information 608 may likewise include technical skill level information, peer information, expense account information, paid time off (PTO) information, data analysis information, insider information, misconfiguration information, third party information, or a combination thereof. In certain embodiments, the personal information 608 may contain sensitive personal information associated with a user entity. As used herein, sensitive personal information (SPI), also commonly referred to as personally identifiable information (PII), broadly refers to any information usable to ascertain the identity of a user entity, either by itself, or in combination with other information, such as contextual information described in greater detail herein.

Examples of SPI may include the full or legal name of a user entity, initials or nicknames, place and date of birth, home and business addresses, personal and business telephone numbers, their gender, and other genetic information. Additional examples of SPI may include government-issued identifiers, such as a Social Security Number (SSN) or a passport number, vehicle registration plate and serial numbers, and driver's license numbers. Other examples of SPI may include certain email addresses and social media identifiers, credit and debit card numbers, and other digital identity information. Yet other examples of SPI may include employer-issued identifiers, financial transaction information, credit scores, electronic medical records (EMRs), insurance claim information, personal correspondence, and so forth. Further examples of SPI may include user authentication factors 604, such as biometrics, user identifiers and passwords, and personal identification numbers (PINs).

In certain embodiments, the SPI may include information considered by an individual user, a group of users, or an organization (e.g., a company, a government or non-government organization, etc.), to be confidential or proprietary. One example of such confidential information is protected health information (PHI). As used herein, PHI broadly refers to any information associated with the health status, provision of health care, or payment for health care that is created or collected by a "covered entity," or an associate thereof, that can be linked to a particular individual. As used herein, a "covered entity" broadly refers to health plans, healthcare clearinghouses, healthcare providers, and others, who may electronically communicate any health-related information associated with a particular individual. Examples of such PHI may include any part of a patient's medical record, healthcare record, or payment history for medical or healthcare services.

As used herein, a user behavior factor 614 broadly refers to information associated with a user entity's behavior, whether the behavior occurs within a physical realm or cyberspace. In certain embodiments, user behavior factors 614 may include the user entity's access rights 616, the user entity's interactions 618, and the date/time/frequency 620 of when the interactions 618 are enacted. In certain embodiments, the user behavior factors 614 may likewise include the user entity's location 622, and the gestures 624 used by the user entity to enact the interactions 618.

In certain embodiments, the user entity gestures 624 may include key strokes on a keypad, a cursor movement, a mouse movement or click, a finger swipe, tap, or other hand gesture, an eye movement, or some combination thereof. In certain embodiments, the user entity gestures 624 may likewise include the cadence of the user's keystrokes, the motion, force and duration of a hand or finger gesture, the rapidity and direction of various eye movements, or some combination thereof. In certain embodiments, the user entity gestures 624 may include various audio or verbal commands performed by the user.

As used herein, user mindset factors 626 broadly refer to information used to make inferences regarding the mental state of a user entity at a particular point in time, during the occurrence of an event or an enactment of a user behavior, or a combination thereof. As likewise used herein, mental state broadly refers to a hypothetical state corresponding to the way a user entity may be thinking or feeling. Likewise, as used herein, an event broadly refers to the occurrence of action performed by an entity. In certain embodiments, the user entity mindset factors 626 may include a personality type 628. Examples of known approaches for determining a personality type 628 include Jungian types, Myers-Briggs type indicators, Keirsy Temperament Sorter, Socionics, Enneagram of Personality, and Eyseneck's three-factor model.

In certain embodiments, the user mindset factors 626 may include various behavioral biometrics 630. As used herein, a behavioral biometric 626 broadly refers to a physiological indication of a user entity's mental state. Examples of behavioral biometrics 630 may include a user entity's blood pressure, heart rate, respiratory rate, eye movements and iris dilation, facial expressions, body language, tone and pitch of voice, speech patterns, and so forth.

Certain embodiments of the invention reflect an appreciation that certain user or entity behavior factors 614, such as user or entity gestures 624, may provide additional information related to inferring a user or entity's mental state. As an example, a user entering text at a quick pace with a rhythmic cadence may indicate intense focus. Likewise, an individual user intermittently entering text with forceful keystrokes may indicate the user is in an agitated state. As another example, the user may intermittently enter text somewhat languorously, which may indicate being in a thoughtful or reflective state of mind. As yet another example, the user may enter text with a light touch with an uneven cadence, which may indicate the user is hesitant or unsure of what is being entered.

Certain embodiments of the invention likewise reflect an appreciation that while the user entity gestures 624 may provide certain indications of the mental state of a particular user entity, they may not provide the reason for the user entity to be in a particular mental state. Likewise, certain embodiments of the invention include an appreciation that certain user or entity gestures 624 and behavioral biometrics 630 are reflective of an individual user's personality type 628. As an example, aggressive, forceful keystrokes combined with an increased heart rate may indicate normal behavior for a particular user when composing end-of-month performance reviews. In various embodiments, certain user entity behavior factors 614, such as user gestures 624, may be correlated with certain contextual information, as described in greater detail herein.

In certain embodiments, a security analytics system 118, described in greater detail herein, may be implemented to include an adaptive trust profile (ATP) system 120. In certain embodiments, the ATP system 120 may be implemented to use a user entity profile 602 in combination with an entity state 638 to generate a user entity mindset profile 632. As used herein, entity state 638 broadly refers to the context of a particular event or entity behavior. In certain embodiments, the entity state 638 may be a long-term entity state or a short-term entity state. As used herein, a long-term entity state 638 broadly relates to an entity state 638 that persists for an extended interval of time, such as six months or a year. As likewise used herein, a short-term entity state 638 broadly relates to an entity state 638 that occurs for a brief interval of time, such as a few minutes or a day. In various embodiments, the method by which an entity state's 638 associated interval of time is considered to be long-term or short-term is a matter of design choice.

As an example, a particular user may have a primary work location, such as a branch office, and a secondary work location, such as their company's corporate office. In this example, the user's primary and secondary offices respectively correspond to the user's location 622, whereas the presence of the user at either office corresponds to an entity state 638. To continue the example, the user may consistently work at their primary office Monday through Thursday, but at their company's corporate office on Fridays. To further continue the example, the user's presence at their primary work location may be a long-term entity state 638, while their presence at their secondary work location may be a short-term entity state 638. Accordingly, a date/time/frequency 620 user entity behavior factor 614 can likewise be associated with user behavior respectively enacted on those days, regardless of their corresponding locations. Consequently, the long-term user or entity state 638 on Monday through Thursday will typically be "working at the branch office" and the short-term entity state 638 on Friday will likely be "working at the corporate office."

As likewise used herein, a user entity mindset profile 632 broadly refers to a collection of information that reflects an inferred mental state of a user entity at a particular time during the occurrence of an event or an enactment of a user behavior. As an example, certain information may be known about a user entity, such as their name, their title and position, and so forth, all of which are user profile attributes 612. Likewise, it may be possible to observe a user entity's associated user behavior factors 614, such as their interactions with various systems, when they log-in and log-out, when they are active at the keyboard, the rhythm of their keystrokes, and which files they typically use.

Certain embodiments of the invention reflect an appreciation these user behavior factors 614 can be considered to be a behavioral fingerprint. In certain embodiments, the user behavior factors 614 may change, a little or a lot, from day to day. These changes may be benign, such as when a user entity begins a new project and accesses new data, or they may indicate something more concerning, such as a user entity who is actively preparing to steal data from their employer. In certain embodiments, the user behavior factors 614 may be implemented to ascertain the identity of a user entity. In certain embodiments, the user behavior factors 614 may be uniquely associated with a particular entity.

In certain embodiments, observed user behaviors may be used to build a user entity profile 602 for a particular user or other entity. In addition to creating a model of a user's various attributes and observed behaviors, these observations can likewise be used to infer things that are not necessarily explicit. Accordingly, in certain embodiments, a behavioral fingerprint may be implemented in combination with an ATP 640 to generate an inference regarding an associated user entity. As an example, a particular user may be observed eating a meal, which may or may not indicate the user is hungry. However, if it is also known that the user worked at their desk throughout lunchtime and is now eating a snack during a mid-afternoon break, then it can be inferred they are indeed hungry.

As likewise used herein, a non-user entity profile 634 broadly refers to a collection of information that uniquely describes a non-user entity's identity and their associated behavior, whether the behavior occurs within a physical realm or cyberspace. In various embodiments, the non-user entity profile 634 may be implemented to include certain non-user profile attributes 636. As used herein, a non-user profile attribute 636 broadly refers to data or metadata that can be used, individually or in combination with other non-user profile attributes 636, to ascertain the identity of a non-user entity. In various embodiments, certain non-user profile attributes 636 may be uniquely associated with a particular non-user entity.

In certain embodiments, the non-user profile attributes 636 may be implemented to include certain identity information, such as a non-user entity's network, Media Access Control (MAC), or physical address, its serial number, associated configuration information, and so forth. In various embodiments, the non-user profile attributes 636 may be implemented to include non-user behavior information associated with interactions between certain user and non-user entities, the type of those interactions, the data exchanged during the interactions, the date/time/frequency of such interactions, and certain services accessed or provided.

In certain embodiments, the ATP system 120 may be implemented to include an event enrichment 680 module, an analytic utility detection 682 module, a contextualization 684 module, and a meaning derivation 686 module, or a combination thereof. In various embodiments, the event enrichment 680 module may be implemented to perform certain event enrichment operations, described in greater detail herein. In various embodiments, the analytic utility detection 682 module may be implemented to perform certain analytic utility detection operations, as likewise described in greater detail herein. In various embodiments, as described in greater detail herein, the contextualization 684 module may be implemented to perform certain contextualization operations. As likewise described in greater detail herein, the meaning derivation 686 module may be implemented to perform certain meaning derivation operations. In various embodiments, the event enrichment 680 module, the meaning derivation 686 module, the contextualization 684 module, and the analytic utility detection 686 module provide an ATP reference architecture for performing various ATP operations, described in greater detail herein.

In various embodiments, as described in greater detail herein, the ATP system 120 may be implemented to use certain data associated with an ATP 640 to derive an inference for contextualizing an electronically observable behavior of a corresponding entity. In certain embodiments, the ATP system 120 may be implemented to use a user profile 602 in combination with a user entity mindset profile 634 and an associated entity state 638 to infer a user entity's intent. In certain embodiments, the ATP system 120 may be implemented to use various data stored in a repository of ATP data 670 to perform such an inference. In certain embodiments, the repository of ATP data 670 may include various ATPs 640 and associated contextual information, described in greater detail herein.

In various embodiments, the ATP system 120 may be implemented to use certain data associated with an ATP 640 to provide a probabilistic measure of whether a particular electronically observable event is of analytic utility. In certain embodiments, an electronically observable event that is of analytic utility may be determined to be anomalous, abnormal, unexpected, or malicious. To continue the prior example, a user may typically work out of their company's corporate office on Fridays. Furthermore, various mindset factors 626 within their associated user entity profile 602 may indicate that the user is typically relaxed and methodical when working with customer data. Moreover, the user's user entity profile 602 indicates that such interactions 618 with customer data typically occur on Monday mornings and the user rarely, if ever, copies or downloads customer data. However, the user may decide to interact with certain customer data late at night, on a Friday, while in their company's corporate office. As they do so, they exhibit an increased heart rate, rapid breathing, and furtive keystrokes while downloading a subset of customer data to a flash drive.

Consequently, their user entity mindset profile 632 may reflect a nervous, fearful, or guilty mindset, which is inconsistent with the entity state 638 of dealing with customer data in general. More particularly, downloading customer data late at night on a day the user is generally not in their primary office results in an entity state 638 that is likewise inconsistent with the user's typical user behavior. As a result, the ATP system 120 may infer that the user's behavior may represent a security threat. Those of skill in the art will recognize that many such embodiments and examples are possible. Accordingly, the foregoing is not intended to limit the spirit, scope or intent of the invention.

Figure 7:
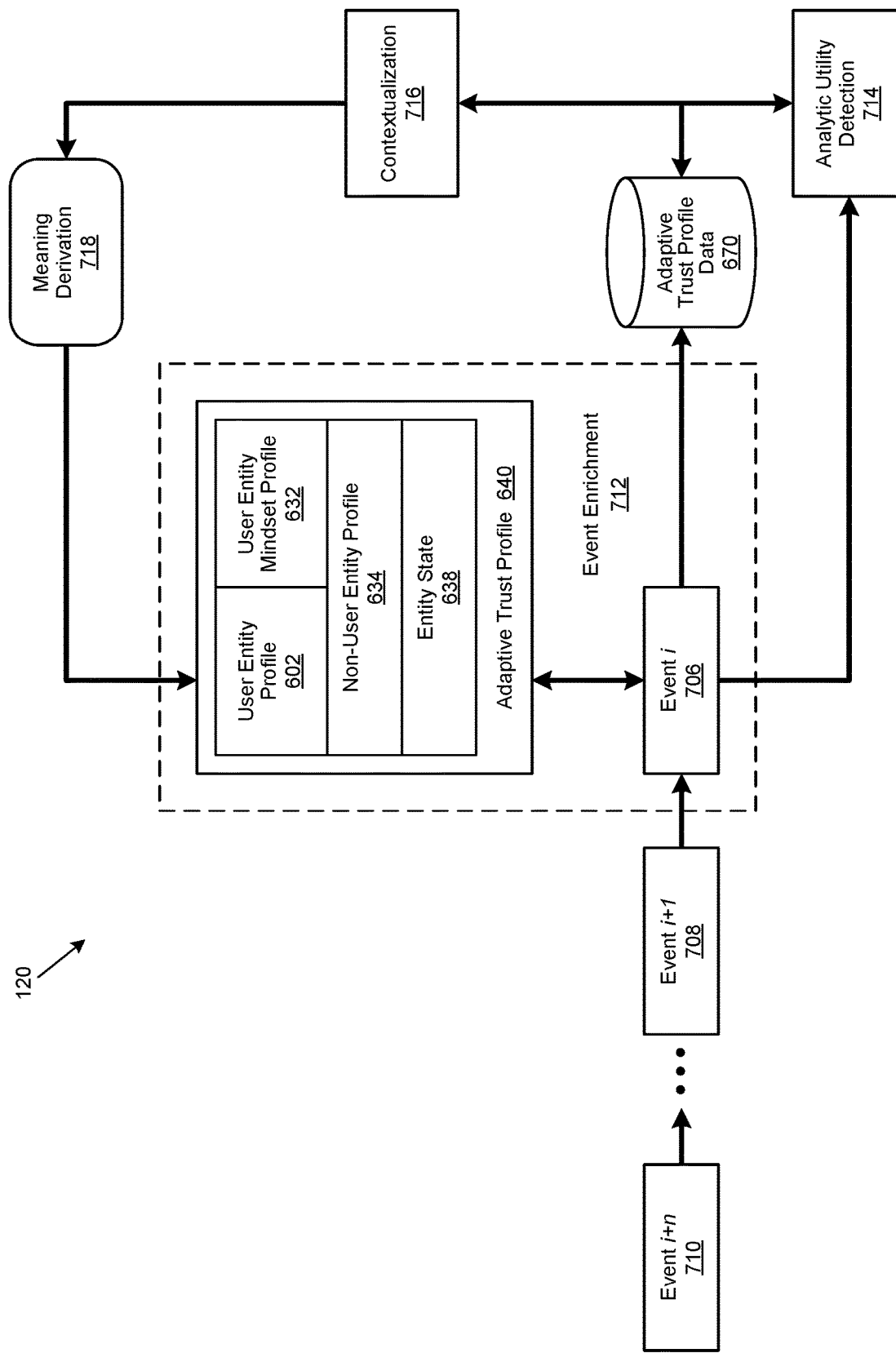
FIG. 7 is simplified block diagram of process flows associated with the operation of an adaptive trust profile (ATP) system.

FIG. 7 is simplified block diagram of process flows associated with the operation of an adaptive trust profile (ATP) system implemented in accordance with an embodiment of the invention. In certain embodiments, the ATP system 120 may be implemented to define and manage an ATP 640, as described in greater detail herein. In certain embodiments, the ATP 640 may be implemented to comprise a user entity profile 602, likewise described in greater detail herein. In certain embodiments, the ATP system 120 may be implemented use the resulting user entity profile 602 in combination with a particular entity state 638 to generate a user entity mindset profile 632, likewise described in greater detail herein. In certain embodiments, the ATP system 120 may be implemented to use the resulting user entity mindset profile 632 in combination with an associated user entity profile 602, non-user entity profile 634, and entity state 638 to detect entity behavior of analytic utility.

In certain embodiments, the ATP system 120 may be implemented to process certain entity information associated with defining and managing an ATP 640. As used herein, entity information broadly refers to information associated with a particular entity. In various embodiments, the entity information may include certain types of content. In certain embodiments, such content may include text, unstructured data, structured data, graphical images, photographs, audio recordings, video recordings, biometric information, and so forth. In certain embodiments, the entity information may include metadata. In certain embodiments, the metadata may include entity attributes, which in turn may include certain entity identifier types or classifications.

In various embodiments, the ATP system 120 may be implemented to use certain entity identifier information to ascertain the identity of an associated entity at a particular point in time. As used herein, entity identifier information broadly refers to an information element associated with an entity that can be used to ascertain or corroborate the identity of its corresponding entity at a particular point in time. In certain embodiments, the entity identifier information may include user authentication factors, user profile attributes, user behavior factors, user mindset factors, information associated with various endpoint and edge devices, networks, resources, or a combination thereof.

In certain embodiments, the entity identifier information may include temporal information. As used herein, temporal information broadly refers to a measure of time (e.g., a date, timestamp, etc.), a measure of an interval of time (e.g., a minute, hour, day, etc.), or a measure of an interval of time (e.g., two consecutive weekdays days, or between Jun. 3, 2017 and Mar. 4, 2018, etc.). In certain embodiments, the temporal information may be associated with an event associated with a particular point in time. As used herein, such a temporal event broadly refers to an occurrence, action or activity enacted by, or associated with, an entity at a particular point in time.

Examples of such temporal events include making a phone call, sending a text or an email, using a device, such as an endpoint device, accessing a system, and entering a physical facility. Other examples of temporal events include uploading, transferring, downloading, modifying, or deleting data, such as data stored in a datastore, or accessing a service. Yet other examples of temporal events include interactions between two or more users, interactions between a user and a device, interactions between a user and a network, and interactions between a user and a resource, whether physical or otherwise. Yet still other examples of temporal events include a change in name, address, physical location, occupation, position, role, marital status, gender, association, affiliation, or assignment.

As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the entity information may include metadata. In various embodiments, the metadata may include temporal event attributes, which in turn may include certain entity identifier types or classifications, described in greater detail herein.

In certain embodiments, the ATP system 120 may be implemented to use information associated with such temporal resolution of an entity's identity to assess the risk associated with a particular entity, at a particular point in time, and adaptively respond with an associated response. In certain embodiments, the ATP system 120 may be implemented to respond to such assessments in order to reduce operational overhead and improve system efficiency while maintaining security integrity. In certain embodiments, the response to such assessments may be performed by a security administrator. Accordingly, certain embodiments of the invention may be directed towards assessing the risk associated with the affirmative resolution of the identity of an entity at a particular point in time in combination with its associated contextual information. Consequently, the ATP system 120 may be more oriented in various embodiments to risk adaptation than to security administration.

In certain embodiments, ATP 640 definition and management operations are begun with the receipt of information associated with event i 706. In certain embodiments, information associated with an initial event i 706 may include user profile attributes, user behavior factors, user mindset factors, entity state information, contextual information, described in greater detail herein, or a combination thereof. In various embodiments, certain user entity profile 602, user entity mindset profile 632, non-user entity profile 634, and entity state 638 data stored in a repository of ATP data 670 may be retrieved and then used to perform event enrichment 712 operations to enrich the information associated with event i 706. In certain embodiment, event enrichment 712 operations are performed by the event enrichment module 680 of the ATP system 120. Analytic utility detection 714 operations are then performed on the resulting enriched information associated with event i 706 to determine whether it is of analytic utility. In certain embodiments, analytic utility detection 714 operations are performed by the analytic utility detection module 682 of the ATP system 120.

In various embodiments, certain contextualization information stored in the repository of ATP data 670 may be retrieved and then used to perform contextualization 716 operations to provide context, based upon the entity's user entity profile 602 or non-user entity profile 634, and its associated entity state 638. In certain embodiments, contextualization 716 operations are performed by the contextualization module 684 of the ATP system 120. In certain embodiments, meaning derivation 718 operations are then performed on the contextualized information associated with event i 706 to derive meaning. In certain embodiments, meaning derivation 718 operations are performed by the meaning derivation module 686 of the ATP system. In certain embodiments, the derivation of meaning may include inferring the intent of an entity associated with event i 706. In certain embodiments, the resulting information associated with event i 706 is then used to update the user entity profile 602 or non-user entity profile 634 corresponding to the entity associated with event i 706. In certain embodiments, the process is iteratively repeated, proceeding with information associated with event i+1 708 through event i+n 710.

From the foregoing, skilled practitioners of the art will recognize that a user entity profile 602, or a non-user entity profile 634, or the two in combination, as implemented in certain embodiments, not only allows the identification of events associated with a particular entity that may be of analytic utility, but also provides higher-level data that allows for the contextualization of observed events. Accordingly, by viewing individual sets of events both in context and with a view to how they may be of analytic utility, it is possible to achieve a more nuanced and higher-level comprehension of an entity's intent.

Figure 8A:
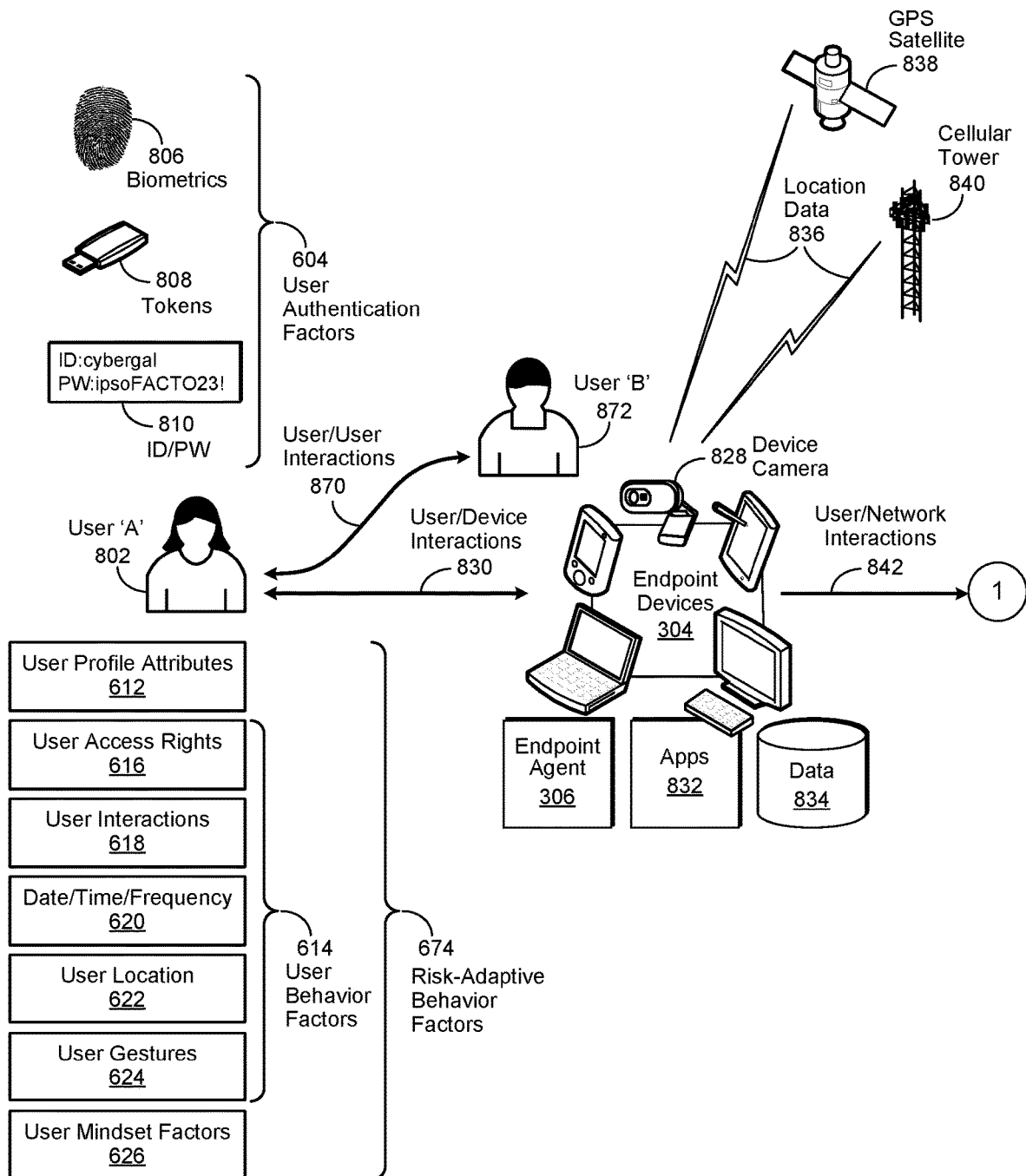
FIGS. 8*a* and 8*b* shows a block diagram of a security analytics system environment.
Figure 8B:
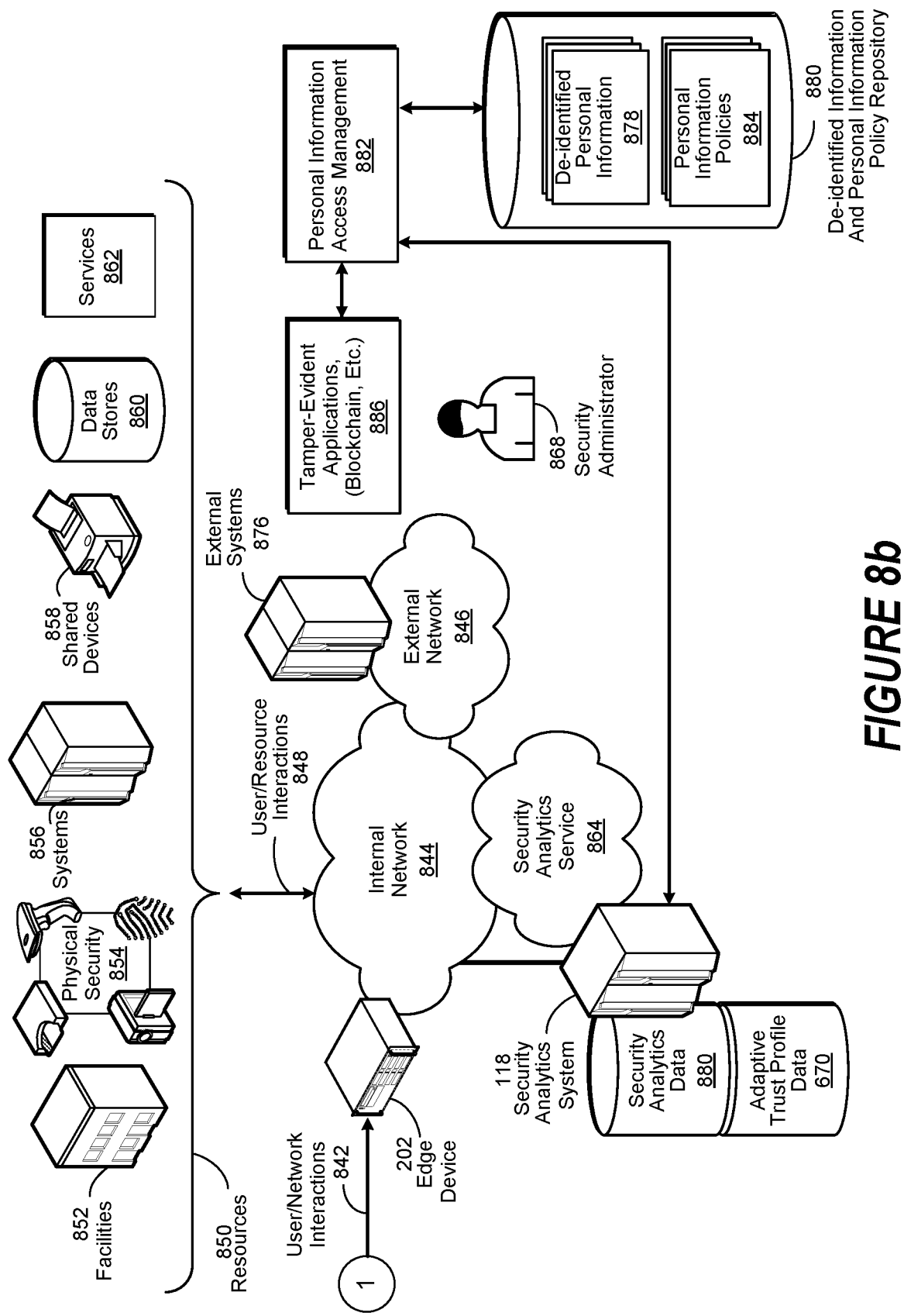

FIGS. 8a and 8b show a block diagram of a security analytics environment implemented in accordance with an embodiment of the invention. In certain embodiments, analyses performed by a security analytics system 118 may be used to identify behavior associated with a particular entity that may be of analytic utility. In certain embodiments, the entity behavior of analytic utility may be identified at a particular point in time, during the occurrence of an event, the enactment of a user or non-user behavior, or a combination thereof.

As used herein, an entity broadly refers to something that exists as itself, whether physically or abstractly. In certain embodiments, an entity may be a user entity, a non-user entity, or a combination thereof. In certain embodiments, a user entity may be an individual user, such as user 'A' 802 or 'B' 872, a group, an organization, or a government. In certain embodiments, a non-user entity may likewise be an item, a device, such as endpoint 304 and edge 202 devices, a network, such as an internal 844 and external 846 networks, a domain, an operation, or a process. In certain embodiments, a non-user entity may be a resource 850, such as a geographical location or formation, a physical facility 852, such as a venue, various physical security devices 854, a system 856, shared devices 858, such as printer, scanner, or copier, a data store 860, or a service 862, such as a service 862 operating in a cloud environment.

As likewise used herein, an event broadly refers to the occurrence of an action performed by an entity. In certain embodiments, the action may be directly associated with a user behavior, described in greater detail herein. As an example, a first user may attach a binary file infected with a virus to an email that is subsequently sent to a second user. In this example, the act of attaching the binary file to the email is directly associated with a user behavior enacted by the first user. In certain embodiments, the action may be indirectly associated with a user behavior. To continue the example, the recipient of the email may open the infected binary file, and as a result, infect their computer with malware. To further continue the example, the act of opening the infected binary file is directly associated with a user behavior enacted by the second user. However, the infection of the email recipient's computer by the infected binary file is indirectly associated with the described user behavior enacted by the second user.

In various embodiments, certain user authentication factors 604 may be used to authenticate the identity of a user entity. In certain embodiments, the user authentication factors 604 may be used to ensure that a particular user, such as user 'A' 802 or 'B' 872, is associated with their corresponding user entity profile, rather than a user entity profile associated with another user. In certain embodiments, the user authentication factors 604 may include a user's biometrics 606 (e.g., a fingerprint or retinal scan), tokens 608 (e.g., a dongle containing cryptographic keys), user identifiers and passwords (ID/PW) 610, and personal identification numbers (PINs).

In certain embodiments, information associated with such user behavior may be stored in a user entity profile, described in greater detail herein. In certain embodiments, the user entity profile may be stored in a repository of adaptive trust profile (ATP) data 670. In certain embodiments, as likewise described in greater detail herein, the user entity profile may include user profile attributes 612, user behavior factors 614, user mindset factors 626, or a combination thereof. As used herein, a user profile attribute 612 broadly refers to data or metadata that can be used, individually or in combination with other user profile attributes 612, user behavior factors 614, or user mindset factors 626, to ascertain the identity of a user entity. In various embodiments, certain user profile attributes 612 may be uniquely associated with a particular user entity.

As likewise used herein, a user behavior factor 614 broadly refers to information associated with a user's behavior, whether the behavior occurs within a physical realm or cyberspace. In certain embodiments, the user behavior factors 614 may include the user's access rights 616, the user's interactions 618, and the date/time/frequency 620 of those interactions 618. In certain embodiments, the user behavior factors 614 may likewise include the user's location 622 when the interactions 618 are enacted, and the user gestures 624 used to enact the interactions 618.

In various embodiments, certain date/time/frequency 620 user behavior factors 614 may be implemented as ontological or societal time, or a combination thereof. As used herein, ontological time broadly refers to how one instant in time relates to another in a chronological sense. As an example, a first user behavior enacted at 12:00 noon on May 17, 2017 may occur prior to a second user behavior enacted at 6:39 PM on May 18, 2018. Skilled practitioners of the art will recognize one value of ontological time is to determine the order in which various user behaviors have been enacted.

As likewise used herein, societal time broadly refers to the correlation of certain user profile attributes 612, user behavior factors 614, user mindset factors 626, or a combination thereof, to one or more instants in time. As an example, user 'A' 802 may access a particular system 856 to download a customer list at 3:47 PM on Nov. 3, 2017. Analysis of their user behavior profile indicates that it is not unusual for user 'A' 802 to download the customer list on a weekly basis. However, examination of their user behavior profile also indicates that user 'A' 802 forwarded the downloaded customer list in an email message to user 'B' 872 at 3:49 PM that same day. Furthermore, there is no record in their user behavior profile that user 'A' 802 has ever communicated with user 'B' 872 in the past. Moreover, it may be determined that user 'B' 872 is employed by a competitor. Accordingly, the correlation of user 'A' 806 downloading the customer list at one point in time, and then forwarding the customer list to user 'B' 872 at a second point in time shortly, thereafter, is an example of societal time.

In a variation of the prior example, user 'A' 802 may download the customer list at 3:47 PM on Nov. 3, 2017. However, instead of immediately forwarding the customer list to user 'B' 872, user 'A' 802 leaves for a two-week vacation. Upon their return, they forward the previously downloaded customer list to user 'B' 872 at 9:14 AM on Nov. 20, 2017. From an ontological time perspective, it has been two weeks since user 'A' 802 accessed the system 856 to download the customer list. However, from a societal time perspective, they have still forwarded the customer list to user 'B' 872, despite two weeks having elapsed since the customer list was originally downloaded.

Accordingly, the correlation of user 'A' 802 downloading the customer list at one point in time, and then forwarding the customer list to user 'B' 872 at a much later point in time, is another example of societal time. More particularly, it may be inferred that the intent of user 'A' 802 did not change during the two weeks they were on vacation. Furthermore, user 'A' 802 may have attempted to mask an intended malicious act by letting some period of time elapse between the time they originally downloaded the customer list and when they eventually forwarded it to user 'B' 872. From the foregoing, those of skill in the art will recognize that the use of societal time may be advantageous in determining whether a particular entity behavior is of analytic utility. As used herein, mindset factors 626 broadly refer to information used to infer the mental state of a user at a particular point in time, during the occurrence of an event, an enactment of a user behavior, or combination thereof.

In certain embodiments, the security analytics system 118 may be implemented to process certain entity information, described in greater detail herein, associated with providing resolution of the identity of an entity at a particular point in time. In various embodiments, the security analytics system 118 may be implemented to use certain entity identifier information, likewise described in greater detail herein, to ascertain the identity of an associated entity at a particular point in time. In various embodiments, the entity identifier information may include certain temporal information, described in greater detail herein. In certain embodiments, the temporal information may be associated with an event associated with a particular point in time.

In certain embodiments, the security analytics system 118 may be implemented to use information associated with certain user behavior elements to resolve the identity of an entity at a particular point in time. A user behavior element, as used herein, broadly refers to a discrete element of a user entity's behavior during the performance of a particular operation in a physical realm, cyberspace, or a combination thereof. In certain embodiments, such user behavior elements may be associated with a user/device interaction 830, a user/network interaction 842, a user/resource interaction 848, a user/user interaction 870, or a combination thereof.

As an example, user 'A' 802 may use an endpoint device 304 to browse a particular web page on a news site on an external system 876. In this example, the individual actions performed by user 'A' 802 to access the web page are user behavior elements that constitute a user behavior. As another example, user 'A' 802 may use an endpoint device 304 to download a data file from a particular system 856. In this example, the individual actions performed by user 'A' 802 to download the data file, including the use of one or more user authentication factors 604 for user authentication, are user behavior elements that constitute a user behavior. In certain embodiments, the user/device 830 interactions may include an interaction between a user, such as user 'A' 802 or 'B' 872, and an endpoint device 304.

In certain embodiments, the user/device 830 interaction may include interaction with an endpoint device 304 that is not connected to a network at the time the interaction occurs. As an example, user 'A' 802 or 'B' 872 may interact with an endpoint device 304 that is offline, using applications 832, accessing data 834, or a combination thereof, it may contain. Those user/device 830 interactions, or their result, may be stored on the endpoint device 304 and then be accessed or retrieved at a later time once the endpoint device 304 is connected to the internal 844 or external 846 networks. In certain embodiments, an endpoint agent 306 may be implemented to store the user/device 830 interactions when the user device 304 is offline.

In certain embodiments, an endpoint device 304 may be implemented with a device camera 828. In certain embodiments, the device camera 828 may be integrated into the endpoint device 304. In certain embodiments, the device camera 828 may be implemented as a separate device configured to interoperate with the endpoint device 304. As an example, a webcam familiar to those of skill in the art may be implemented receive and communicate various image and audio signals to an endpoint device 304 via a Universal Serial Bus (USB) interface.

In certain embodiments, the device camera 828 may be implemented to capture and provide user/device 830 interaction information to an endpoint agent 306. In various embodiments, the device camera 828 may be implemented to provide surveillance information related to certain user/device 830 or user/user 870 interactions. In certain embodiments, the surveillance information may be used by the security analytics system 118 to detect behavior associated with a user entity, such as user 'A' 802 or user 'B' 872 that may be of analytic utility.

In certain embodiments, the endpoint device 304 may be used to communicate data through the use of an internal network 844, an external network 846, or a combination thereof. In certain embodiments, the internal 844 and the external 846 networks may include a public network, such as the Internet, a physical private network, a virtual private network (VPN), or any combination thereof. In certain embodiments, the internal 844 and external 846 networks may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments, the user/user 870 interactions may include interactions between two or more user entities, such as user 'A' 802 and 'B' 872. In certain embodiments, the user/user interactions 870 may be physical, such as a face-to-face meeting, via a user/device 830 interaction, a user/network 842 interaction, a user/resource 648 interaction, or some combination thereof. In certain embodiments, the user/user 870 interaction may include a face-to-face verbal exchange. In certain embodiments, the user/user 870 interaction may include a written exchange, such as text written on a sheet of paper. In certain embodiments, the user/user 870 interaction may include a face-to-face exchange of gestures, such as a sign language exchange.

In certain embodiments, temporal event information associated with various user/device 830, user/network 842, user/resource 848, or user/user 870 interactions may be collected and used to provide real-time resolution of the identity of an entity at a particular point in time. Those of skill in the art will recognize that many such examples of user/device 830, user/network 842, user/resource 848, and user/user 870 interactions are possible. Accordingly, the foregoing is not intended to limit the spirit, scope or intent of the invention.

In various embodiments, the security analytics system 118 may be implemented to process certain contextual information in the performance of certain security analytic operations. As used herein, contextual information broadly refers to any information, directly or indirectly, individually or in combination, related to a particular entity behavior. In certain embodiments, entity behavior may include a user entity's physical behavior, cyber behavior, or a combination thereof. As likewise used herein, a user entity's physical behavior broadly refers to any user behavior occurring within a physical realm, such as speaking, gesturing, facial patterns or expressions, walking, and so forth. More particularly, such physical behavior may include any action enacted by an entity user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user entity that can be observed through the use of an electronic device (e.g., an electronic sensor), a computing device or system (e.g., an endpoint 304 or edge 202 device, a physical security device 854, a system 856, a shared device 858, etc.), computer instructions (e.g., a software application), or a combination thereof.

Cyber behavior, as used herein, broadly refers to any behavior occurring in cyberspace, whether enacted by an individual user, a group of users, or a system acting at the behest of an individual user, a group of users, or other entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system 856 at a particular point in time. In this example, the individual actions performed by the user to download the data file, and associated temporal information, such as a timestamp associated with the download, constitute a cyber behavior. In these examples, the actions are enacted within cyberspace, in combination with associated temporal information, which makes them electronically-observable.

In certain embodiments, the contextual information may include location data 836. In certain embodiments, the endpoint device 304 may be configured to receive such location data 836, which is used as a data source for determining the user's location 622. In certain embodiments, the location data 836 may include Global Positioning System (GPS) data provided by a GPS satellite 838. In certain embodiments, the location data 836 may include location data 836 provided by a wireless network, such as from a cellular network tower 840. In certain embodiments (not shown), the location data 836 may include various Internet Protocol (IP) or other network address information assigned to the endpoint 304 or edge 202 device. In certain embodiments (also not shown), the location data 836 may include recognizable structures or physical addresses within a digital image or video recording.

In certain embodiments, the endpoint devices 304 may include an input device (not shown), such as a keypad, magnetic card reader, token interface, biometric sensor, and so forth. In certain embodiments, such endpoint devices 304 may be directly, or indirectly, connected to a particular facility 852, physical security device 854, system 856, or shared device 858. As an example, the endpoint device 304 may be directly connected to an ingress/egress system, such as an electronic lock on a door or an access gate of a parking garage. As another example, the endpoint device 304 may be indirectly connected to a physical security device 854 through a dedicated security network.

In certain embodiments, the security analytics system 118 may be implemented to perform various risk-adaptive protection operations. Risk-adaptive, as used herein, broadly refers to adaptively responding to risks associated with an electronically-observable entity behavior. In various embodiments, the security analytics system 118 may be implemented to perform certain risk-adaptive protection operations by monitoring certain entity behaviors, assess the corresponding risk they may represent, individually or in combination, and respond with an associated response. In certain embodiments, such responses may be based upon contextual information, described in greater detail herein, associated with a given entity behavior.

In certain embodiments, various risk-adaptive behavior factors 674, likewise described in greater detail herein, may be used to perform the risk-adaptive protection operations. In certain embodiments, the risk-adaptive behavior factors 674 may include user profile attributes 612, user behavior factors 614, user mindset factors 626, or a combination thereof. In these embodiments, the risk-adaptive behavior factors 674 used to perform the risk-adaptive protection operations is a matter of design choice.

In certain embodiments, the security analytics system 118 may be implemented as a stand-alone system. In certain embodiments, the security analytics system 118 may be implemented as a distributed system. In certain embodiment, the security analytics system 118 may be implemented as a virtual system, such as an instantiation of one or more virtual machines (VMs). In certain embodiments, the security analytics system 118 may be implemented as a security analytics service 864. In certain embodiments, the security analytics service 864 may be implemented in a cloud environment familiar to those of skill in the art. In various embodiments, the security analytics system 118 may use data stored in a repository of security analytics data 880 in the performance of certain security analytics operations, described in greater detail herein. Those of skill in the art will recognize that many such embodiments are possible. Accordingly, the foregoing is not intended to limit the spirit, scope or intent of the invention.

In certain instances, user information may be anonymized or de-identified. In certain implementations, personal identifiable information (PII) can be encrypted or removed from data sets or data objects, allowing persons or entities associated with the data to remain unknowable without the requisite key(s). The data sets or data subjects of de-identified data can be categorized. For certain implementations, pseudonyms may be used to associate entity and/or entity behavior to the data, where the pseudonym enrichment system 122 described above can be implemented. De-identified data can include a pseudonym associated with an individual. The source of data or information can be protected in an application, such as the use of a distributed ledger technology or DLT, which includes block chains, hashgraphs, block directed acyclic graphs (blockDAG), transaction based directed acyclic graphs (TDAG), etc.

In certain implementations, it is desirable to protect the source of the information, such as when protecting a user or individual's personal information. Personal information, also commonly referred to as personally identifiable information (PII) or personal data (PD), broadly refers to any information usable to ascertain the identity of a user, either by itself, or in combination with other information, such as contextual information described in greater detail herein. Examples of PD may include the full or legal name of a user, initials or nicknames, place and date of birth, home and business addresses, personal and business telephone numbers, their gender, and other genetic information. In certain implementations, such PD can be included in an adpatATP.

Another aspect of PD is any information associated with a particular individual that is considered sensitive. One example of such sensitive information is protected health information (PHI). As used herein, PHI broadly refers to any information associated with the health status, provision of health care, or payment for health care that is created or collected by a "covered entity," or an associate thereof, that can be linked to a particular individual. As used herein, a "covered entity" broadly refers to health plans, healthcare clearinghouses, healthcare providers, and others, who may electronically communicate any health-related information associated with a particular individual. Examples of such PHI may include any part of a patient's medical record, healthcare record, or payment history for medical or healthcare services.

Other examples of PD may include national identification numbers, such as a racial or ethnic origin, political opinions, religious or philosophical beliefs, or trade union membership, genetic data, biometric data, data concerning health or data concerning a natural person's sex life or sexual orientation Yet other examples of PD may include biometrics, system access rights, personality type information, various financial information, such as credit scores, personal correspondence, and other confidential information. Skilled practitioners of the art will recognize that many such examples of SPI are possible. Accordingly, the foregoing is not intended to limit the spirit, scope, or intent of the invention.

In certain of these embodiments, the de-identified personal information may be decrypted or re-identified as a result of granting a requestor, such as a security administrator 868, access to de-identified personal information 878. In other words, a re-identification operation of de-identified data can be initiated by the security administrator 868. The decryption or re-identification operation can use a re-identification key. In various embodiments, the de-identified personal information 878 is stored in a repository of de-identified personal information and personal information policies 880 for use in associated security analytics system 118 operations, described in greater detail herein.

In certain embodiments, conditional access to de-identified personal information 878, is managed through the implementation of a personal information access management system 882. In various embodiments, the personal information access management system 882 is implemented to retrieve de-identified personal information 878 from a repository of de-identified personal information and personal information policies 880, according to personal information policies 884. In certain embodiments, encryption, such as a token or hash can be associated with de-identified personal information 878. In other words, de-identified personal information 878 can be stored in encrypted form. An encryption process can include the use of pseudonyms (pseudonymization), cryptographic keys, etc. In these embodiments, decryption operations familiar to those of skill in the art are used to decrypt the de-identified personal information 878, such as the use of a re-identification key.

In certain embodiments, a tamper-evident application, such as a block chain 886 may be implemented to re-identify de-identified personal information 878 as further discussed below. Conditional access policy, such as personal information, generation operations are begun in various embodiments by first determining the requirements for a particular policy. Known user authentication factors, identification factors, and risk-adaptive behavior factors, all described in greater detail herein, are then identified, as well as where they are used, and how. In various embodiments, the security analytics system 118 may be implemented to learn where a user or entity enters their personal information in certain applications. In certain embodiments, the security analytics system 118 may perform the learning through the implementation of machine learning approaches familiar to those of skill in the art.

In various embodiments, conditional de-identified personal information 878 operations are begun by the security analytics system 118 receiving a request for conditional access to certain de-identified personal information 878. Once the conditional de-identified personal information 878 access request is received, personal information policies 884 associated with the requested SPI are retrieved and then used to process the request and determine what authorization is required to access the de-identified personal information 878. A determination is then made whether the requestor, such as a security administrator 868, of the conditional access request has the required authorization to access the de-identified personal information 878. If not, then a determination is made whether to request additional authorization. For example, manager of the security administrator 868, or other superior, may need to provide authorization to access the de-identified personal information 878. These embodiments may be part of a data access governance process.

If additional authorization is granted, or if it was determined that the requestor had sufficient authorization to make the request, then the de-identified personal information 878 is accessed. The de-identified personal information 878 can then be re-identified.

Figure 9:
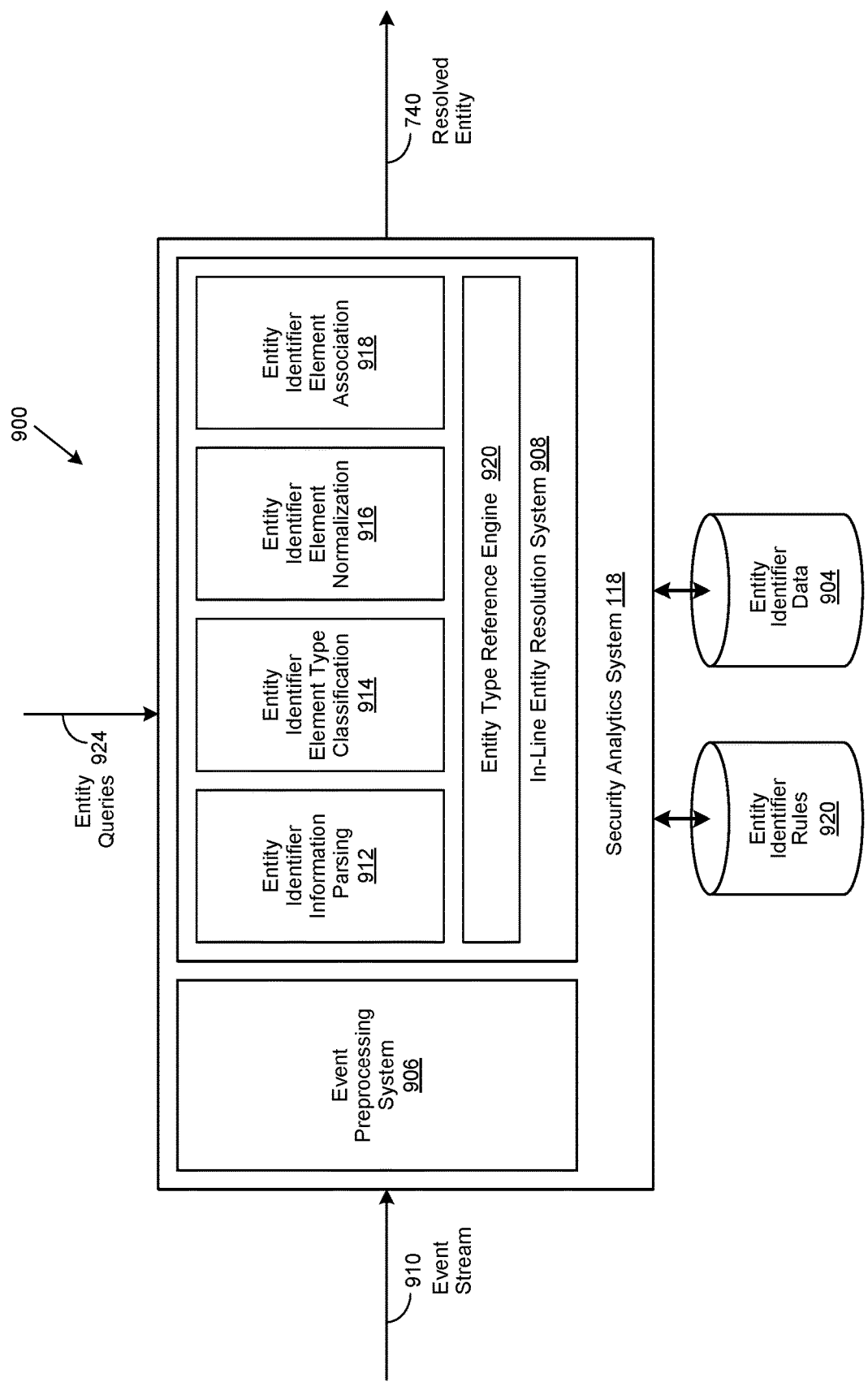
FIG. 9 is a simplified block diagram of an in-line entity resolution system.

FIG. 9 is a simplified block diagram 900 of an in-line entity resolution system implemented in accordance with an embodiment of the invention. In certain embodiments, a security analytics system 118 may be implemented to process certain entity information corresponding to an event to resolve the identity of an associated entity. As used herein, entity information broadly refers to information that can be used to ascertain or corroborate the identity of an entity and its associated behavior, whether the behavior occurs within a physical realm or cyberspace. In certain embodiments, entity information may include user profile attributes, user behavior factors, or user mindset factors, described in greater detail herein. In various embodiments, entity information may include certain types of content. In these embodiments, such content may include text, unstructured data, structured data, graphical images, photographs, audio recordings, video recordings, biometric information, and so forth. In certain embodiments, the entity information may include metadata. In certain embodiments, the metadata may include entity attributes, which in turn may include certain entity identifier types or classifications.

In various embodiments, the security analytics system 118 may be implemented to use certain entity identifier information to ascertain the identity of an associated entity at a particular point in time. As used herein, entity identifier information broadly refers to an information element associated with an entity that can be used to ascertain or corroborate the identity of its corresponding entity at a particular point in time. In certain embodiments, the entity identifier information may include user authentication factors, user profile attributes, user behavior factors, user mindset factors, information associated with various endpoint and edge devices, networks, resources, or a combination thereof.

In certain embodiments, the entity identifier information may include temporal information. As used herein, temporal information broadly refers to a particular point in time (e.g., a date, timestamp, etc.), a measure of time (e.g., a minute, hour, day, etc.), or an interval of time (e.g., between Jun. 3, 2017 and Mar. 4, 2018, etc.). In certain embodiments, the temporal information may be associated with an event associated with a particular point in time, a measure of time, an interval of time, or a combination thereof. As used herein, such a temporal event broadly refers to an occurrence, action or activity enacted by, or associated with, an entity at a particular point in time, for a measure of time, during an interval of time, or a combination thereof.

Examples of such temporal events include making a phone call, sending a text or an email, using a device, such as an endpoint device, accessing a system, and entering a physical facility. Other examples of temporal events include uploading, transferring, downloading, modifying, or deleting data, such as data stored in a datastore, or accessing a service. Yet other examples of temporal events include interactions between two or more users, interactions between a user and a device, interactions between a user and a network, and interactions between a user and a resource, whether physical or otherwise. Yet still other examples of temporal events include a change in name, address, physical location, occupation, position, role, marital status, gender, association, affiliation, or assignment.

As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the entity information may include metadata. In various embodiments, the metadata may include temporal event attributes, which in turn may include certain entity identifier types or classifications, described in greater detail herein. In certain embodiments, the temporal event information may be used to resolve the identity of an entity at a particular point in time, for a measure of time, during an interval of time, or a combination thereof.

In certain embodiments, the security analytics system 118 may be implemented to use information associated with such temporal resolution of an entity's identity to assess the risk associated with a particular entity, for a measure of time, during an interval of time, or a combination thereof, and respond with an associated response. In certain embodiments, the security analytics system 118 may be implemented to respond to such assessments in order to reduce operational overhead and improve system efficiency while maintaining security integrity. In certain embodiments, the response to such assessments may be performed by a security administrator. Accordingly, certain embodiments of the invention may be directed towards assessing the risk associated with the affirmative resolution of the identity of an entity at a particular point in time, for a measure of time, during an interval of time, or a combination thereof, in combination with its associated contextual information. Consequently, the security analytics system 118 may be more oriented in various embodiments to risk mitigation than to security administration.

In certain embodiments, the security analytics system 118 may be implemented to resolve the identity of an entity by performing various entity resolution operations. As used herein, entity resolution broadly refers to resolving certain raw identifiers in input data to a particular entity. In certain embodiments, the entity resolution operations may include parsing, classifying and normalizing entity identifier information to generate entity identifier elements, which in turn are matched, or resolved, to a particular entity.

In certain embodiments, the performance of various entity resolution operations may result in new entity identifier elements being resolved to an existing, or previously-identified entity. In certain embodiments, the performance of various entity resolution operations may result in the creation of a previously-unknown or previously-unidentified entity. In these embodiments, the new entity identifier elements may be resolved to the newly-created entity. In certain embodiments, the entity identifier elements, and resolution data related to their association with a particular resolved entity 902, may be stored in a repository of entity identifier data 904.

In certain embodiments, the security analytics system 118 may be implemented to perform in-line entity resolution operations to resolve the identity of a particular entity. As used herein, in-line entity resolution broadly refers to resolving the identity of an entity prior to the performance of the next step of a particular process corresponding to an event associated with the entity. In certain embodiments, the security analytics system 118 may be implemented to include an event preprocessing system 906 and an in-line entity resolution system 908. In certain embodiments, the event preprocessing system 906 may be implemented to perform event preprocessing operations. In certain embodiments, the event preprocessing system 906 may be implemented to generate extracted event features from an event stream 910.

In certain embodiments, the in-line entity resolution system 908 may be implemented to include an entity identifier information parsing 912 module, an entity identifier element type classification 914 module, an entity identifier element normalization 916 module, an entity identifier element association 918 module, and an entity type reference engine 920, or some combination thereof. In certain embodiments, the entity identifier information parsing 912 module may be implemented to process extracted event features generated by the event preprocessing system 906 to generate entity identifier elements.

As an example, the event stream 910 may contain text stating, "John Smith was the VP of Sales for NewCo from May 9, 2016 through Jun. 15, 2017, at which time Bob Jones assumed the position, which he held until Nov. 20, 2017." In this example, the resulting extracted event features may include "John Smith," "Bob Jones," "VP of Sales," "NewCo," "May 9, 2016," "Jun. 15, 2017," and "Nov. 20, 2017." To continue the example, the resulting entity identifier elements generated by the entity identifier information parsing 912 module may include "John Smith," "Bob Jones," "VP of Sales," and "NewCo." To further continue the example, the extracted event features of "May 9, 2016," "Jun. 15, 2017," and "Nov. 20, 2017" may be used as temporal identity resolution factors, described in greater detail herein, to assist in the performance of in-line entity resolution operations.

As another example, the event stream 910 may include a data record associated with a package delivery, which in turn may include a delimited string of data such as, "Rob Adams, NewCo, 30.648748, −97.687856, John Smith, 02.17.2018, 2:03." In this example, the resulting extracted event features may include "Rob Adams," "NewCo," "30.648748," "−97.687856," "John Smith," "02.17.2017," and "2:03." To continue the example, the resulting entity identifier elements generated by the entity identifier information parsing 704 module may include "Rob Adams," "NewCo," and "John Smith." To further continue the example, the extracted event features of "30.648748" and "−97.687856" may be used as location data and the extracted event features "02.17.2017" and "2:03" may be used as temporal identity resolution factors, all of which may be used to assist in the performance of in-line entity resolution operations.

As yet another example, the event stream 910 may include an email address, such as "John Smith john.smith@newco.com". In this example, the resulting extracted event features may include "John Smith," "john.smith," and "newco.com," all of which may be used as entity identifier elements. As yet still another example, the event stream 602 may include a timestamped log of a file downloaded from a particular datastore, such as "jsmith, abc123!, salesleads.xls, 2017.04.04, 16:33:24:45." In this example, the resulting extracted event features may include "jsmith," and "abc123!," "salesleads.xls," "2017.04.04," and "16:33:24:45." To continue the example, the extracted event features of "jsmith," and "abc123 !" may be used as entity identifier elements. Likewise, the extracted event feature of "salesleads.xls" may be used as contextual information and the extracted event features "2017.04.04" and "16:33:24:45" may be used as temporal identity resolution factors, all of which may be used to assist in the performance of in-line entity resolution operations.

In certain embodiments, the entity identifier element type classification module 914 may be implemented to use the entity type reference engine 920 to assign an entity identifier element type to each entity identifier element generated by the entity identifier information parsing module 912. As used herein, an entity identifier element type broadly refers to a representation of a particular attribute associated with an entity identifier element. In certain embodiments, the entity type reference engine 920 may be implemented to use a repository of entity identifier classification rules 922 to assign an entity identifier element type to each entity identifier element.

Using the prior examples to illustrate the use of the entity identifier element type classification 914 module, the entity identifier elements "John Smith," "Bob Jones," and "Rob Adams" may each be recognized as a person's name. Accordingly, they may have a "name" entity identifier element type assigned to them. Likewise, the entity identifier elements "john.smith" and "jsmith" may be respectively recognized as an email address name and a user ID. Accordingly, they may respectively be assigned "email name" and "user name" entity identifier element types.

To continue using the prior examples, the entity identifier elements "VP of Sales" and "NewCo" may be respectively recognized as a person's title and the name of a company, while "newco.com" may be recognized as a domain name. Accordingly, they may respectively be assigned "title," "company," and "domain" entity identifier element types. Likewise, the temporal identity resolution factors of "May 9, 2016," "Jun. 15, 2017," "Nov. 20, 2017," "02.17.2018," "2017.04.04," may all be recognized as dates in different formats, while "2:03" and "16:33:24:45" may both be recognized as timestamps. Accordingly, they may respectively be assigned "date" and "time" entity identifier element types.

To further continue using the prior examples, the extracted event features of "30.648748" and "−97.687856" may be recognized as Global Positioning System (GPS) coordinates. Accordingly, they may be assigned an entity identifier element type of "GPS." Likewise, the entity identifier elements of "abc123!" and "salesleads.xls" may respectively be recognized as a password and a file name. Accordingly, they may respectively be assigned entity identifier element types of "password" and "file name."

In certain embodiments, the identity resolution system 118 may be implemented to include an entity identifier element normalization 916 module. In certain embodiments, the entity identifier element normalization 916 module may be implemented to normalize entity identifier elements classified by the entity identifier element type classification 914 module. In certain embodiments, the entity identifier element normalization 916 module may be implemented to use rules stored in a repository of entity identifier normalization rules 992 to normalize an entity identifier element.

In certain embodiments, the entity identifier element normalization 916 module may be implemented to generate type-dependent normalized entity identifier elements. As an example, an entity identifier element may be classified as an email entity identifier type. However, the entity identifier element may be further classified to be a Simple Mail Transport Protocol (SMTP) or Microsoft® Exchange® email address. Accordingly, in certain embodiments, the classified entity identifier element may be respectively processed to generate a type-dependent normalized entity identifier element according to whether it is an SMTP or Exchange® email address. In certain embodiments, the normalization operations performed by the entity identifier element normalization 916 module may result in an inferred relationship between two or more entity identifier elements, as described in greater detail herein.

Using the prior examples to illustrate the use of the entity identifier element normalization 916 module, the temporal identity resolution factors of "May 9, 2016," "Jun. 15, 2017," "Nov. 20, 2017," "02.17.2018," and "2017.04.04" may all be assigned an entity identifier type of "date," yet they do not share a consistent format. Accordingly, they may respectively be normalized by the entity identifier element normalization 708 module into a common format, such as "2016.05.09," "2017.06.15," "2017.11.20," "02.17.2018," and "2017.04.04." Likewise, the temporal identity resolution factors of "2:03" and "16:33:24:45" may both be assigned an entity identifier type of "time," yet they do not share the same format. Accordingly, they may respectively be normalized by the entity identifier element normalization 708 module into a common format, such as "02:03:00:00" and "16:33:24:45."

In continuing to use the prior examples to illustrate the use of the entity identifier element normalization 916 module, the event stream 910 may have contained an email address of "John Smith <john.smith@newco.com>". In the prior example, the resulting entity identifier elements included "John Smith," "john.smith," and "newco.com." Likewise, the entity identifier elements of "john.smith," and "newco.com" were respectively assigned entity identifier types of "email name" and "domain." Accordingly, the original email address of "John Smith <john.smith@newco.com>" may be normalized into a uniform format, such as "john.smith@newco.com."

In certain embodiments, the entity identifier element normalization 916 module may be implemented to normalize a variety of entity identifier information, such as user authentication factors, user identity factors, location data, information associated with various endpoint and edge devices, internal and external network addresses, resource entities, or a combination thereof. Skilled practitioners of the art will recognize that many such embodiments are possible. Accordingly, the foregoing is not intended to limit the spirit, scope or intent of the invention.

In certain embodiments, the entity identifier element association 918 module may be implemented to associate related entity identifier elements that have respectively been classified and normalized by the entity identifier element type classification 914 module and the entity identifier element normalization 916 module. In various embodiments, the entity identifier element association 918 module may be implemented to associate certain temporal information with a classified or normalized entity identifier element.

In certain embodiments, the temporal information may include the time at which related entity identifier elements that have respectively been classified and normalized by the entity identifier element type classification 914 module and the entity identifier element normalization 916 module. In certain embodiments, the temporal information may include the time at which a normalized entity identifier element has been matched, or resolved, to a particular entity. In certain embodiments, the association operations performed by the entity identifier element association 918 module may result in the classified and normalized entity identifier elements to be cross-referenced to one another or otherwise indexed.

In certain embodiments, the association operations performed by the entity identifier element association 918 module may result in the cross-referencing, or indexing, of classified and normalized entity identifier elements that were not originally related to one another. To continue using the prior examples to illustrate such cross-referencing, the entity identifier elements "John Smith," "VP of Sales," "NewCo," "2016.05.09," "2017.06.15," "john.smith," "newco.com" "jsmith," and "abc123!" may have been parsed, classified and normalized from different event streams 602. However, they are all related to one another. Accordingly, they may be cross-referenced, or otherwise indexed, to create a unified data record, such as "John Smith, VP of Sales, Newco, john.smith@newco.com, jsmith, abc123!, 2016.05.09, 2017.06.15." In certain embodiments, the entity identifier element association 918 module may be implemented to store such cross-referenced, or otherwise indexed, entity identifier data elements in a repository of entity identifier data 904.

In certain embodiments, the event stream 910 may be received in real-time. In certain embodiments the in-line resolution of the identity of an entity may be performed in real-time. In certain embodiments, the in-line entity resolution system 908 may be implemented to use identity reference data stored in the repository of entity identifier data 904 to resolve the identity of an entity. In certain embodiments, the security analytics system 118 may be implemented to process various entity queries 924 by performing entity querying operations.

As used herein, entity querying operations broadly refer to operations associated with parsing, classifying and normalizing entity identifiers to generate entity identifier elements, which are in turn processed to identify, or resolve, a corresponding entity. In certain embodiments, the identification, or resolution, of the entity is performed by using the entity identifier elements to query a repository of entity identifier data 904. In certain embodiments, performance of the entity querying operations may result in the identification of additional entity identifier elements associated with the identified, or resolved, entity. In certain embodiments, such additional entity identifier elements may be returned as a result of performing the entity querying operations.

In certain embodiments, the entity querying operations may be performed in response to receiving an entity query 924 from a risk service. In certain embodiments, the entity querying operations may be performed in response to receiving an entity query from a security analytics system or service, likewise described in greater detail herein. In certain embodiments, the entity querying operations may be performed in response to receiving an entity query from a querying system. In these embodiments, the querying system selected to submit an entity query 924 for entity identifier data 904 to the security analytics system 118 is a matter of design choice.

In certain embodiments, the entity identifier elements returned as a result of the entity querying operations may be used in combination with other data to perform various security analysis operations. Skilled practitioners of the art will appreciate that such security analysis operations will likely be more useful and accurate when aggregated by a particular entity instead of by various entity identifier elements. Those of skill in the art will likewise recognize that many such embodiments are possible. Accordingly, the foregoing is not intended to limit the spirit, scope or intent of the invention.

Referring back to FIG. 8b, in certain embodiments, the edge device 202 may provide contextual information, including events, to the pseudonym enrichment system 124. In certain embodiments, the pseudonym enrichment system 124 (included in security analytics system 118), determines whether the information provided by the edge device 202 includes an entity name. In certain embodiments, the pseudonym enrichment system 124 determines whether the entity name has a corresponding pseudonym and images the event with the pseudonym name corresponding to the entity name. In certain embodiments, the pseudonymized information is provided to the security analytics system 118 which, in turn, analyzes the pseudonymized information so as to maintain the anonymity of the entity. In certain embodiments, the edge device 202 makes a determination as to whether the received events include entity names and passes only those events having entity names directly to the pseudonym enrichment system 124 thereby bypassing the security analytics system 118 for such events. In certain embodiments, the pseudonym enrichment system 124 provides pseudonymized events to the security analytics system 118. In certain embodiments, events that do not include an entity name are passed directly from the edge device 202 to the security analytics system 118.

In certain embodiments, the edge device 202 may be configured to pass all events to the pseudonym enrichment system 124 before they are passed to the security analytics system 118. In such instances, the edge device 202 routes all events directly to the pseudonym enrichment system 124 thereby bypassing the security analytics system 118. In certain embodiments, the edge device 202 accepts a stream of raw events and generates a plurality of resolved events for consumption by the pseudonym enrichment system 124. As used herein, a resolved event is an event that includes an entity name and its corresponding event information, such as event type, event time, feature, etc. In certain embodiments, the pseudonym enrichment system 124 makes the determination as to whether the raw events are to be associated with entity names and, if so, resolves the event with the corresponding entity name. In certain embodiments, the pseudonym enrichment system pseudonymizes the events as needed. In certain embodiments, events that do not include entity names as well as events not needing pseudonymization are also passed from the edge device 202 through the pseudonym enrichment system 124.

In certain embodiments, the pseudonym enrichment system 124 provides a manner of identifying entities in certain events by substituting pseudonyms for entity names in received events. In certain embodiments, the security analytics system 118 along with a probability distribution analysis operation use the pseudonymized events to assess security risks associated with various entities. In certain embodiments, the probability distribution analysis operation, pseudonym enrichment operations, and analytics operations improve processor efficiency, and thus the efficiency of the information handling system 100, by analyzing pseudonymized events. As will be appreciated, once the information handling system 100 is configured to perform the probability distribution analysis operations, the pseudonym enrichment operations, and analytics operations, the information handling system 100 becomes a specialized computing device specifically configured to perform such operations and is not a general-purpose computing device. Moreover, the implementation of the pseudonym enrichment system 124, and security analytics system 118, on the information handling system 100 improves the functionality of the information handling system 100 and provides a useful and concrete result of analyzing the probability distribution of features associated with certain interrelated events.

Figure 10:
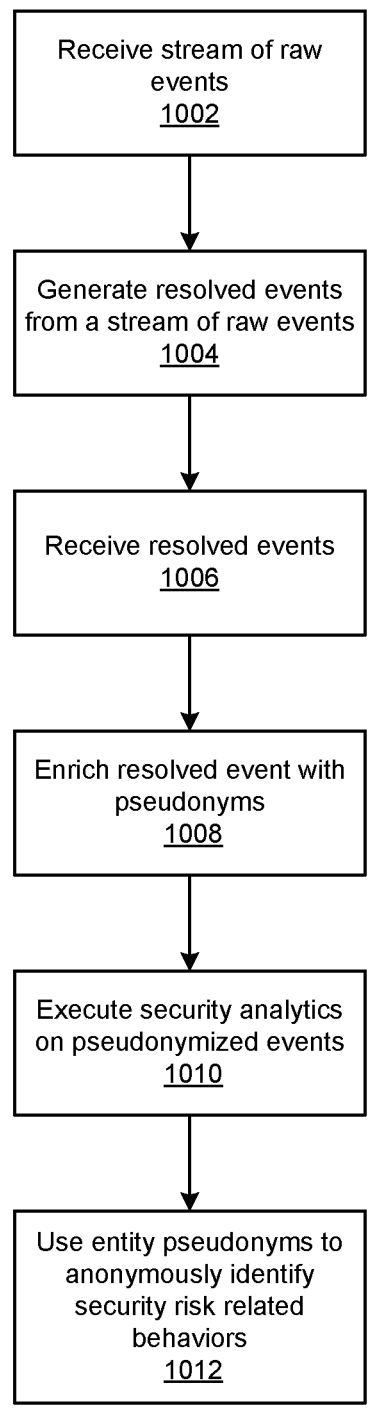
FIG. 10 is a flow diagram depicting exemplary operations that may be executed pursuant to using pseudonyms to anonymize entities for security analysis.

FIG. 10 is a flow diagram depicting exemplary operations that may be executed pursuant to using pseudonyms to obfuscate entities for security analysis. In certain embodiments, a stream of raw events is received at operation 1002. In certain embodiments, the raw events in the stream of raw events are resolved to include entity names at operation 1004. In certain embodiments, resolution of the events from the stream of raw events is executed by the pseudonym enrichment system. In certain embodiments, event resolution takes place outside of the pseudonym enrichment system such as at an edge device or at an endpoint device. In certain embodiments, the events that are to be pseudonymized are received at operation 1006. At operation 1008, the events may be pseudonymized. In certain embodiments, for example, pseudonymized events may be generated by enriching the events with entity pseudonyms for entity names from the resolved events and substituting corresponding pseudonyms. In certain embodiments, the pseudonymized events are analyzed at operation 1010. At operation 1012, entity pseudonyms are used to identify security-related risk behaviors detected in the pseudonymized events.

Figure 11:
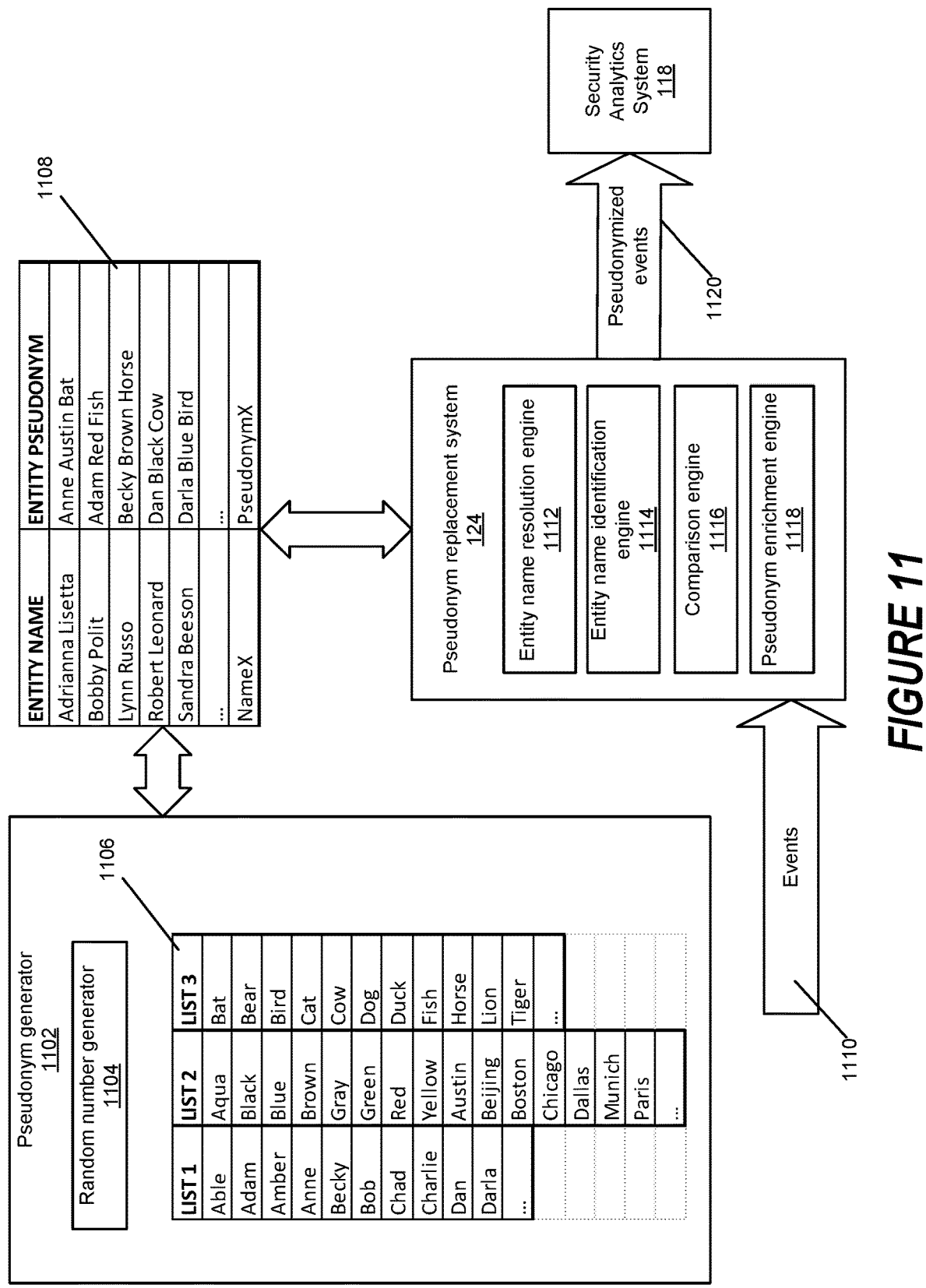
FIG. 11 is a block diagram showing one environment in which certain embodiments of the pseudonym enrichment system may operate.

FIG. 11 is a block diagram showing one environment in which certain embodiments of the pseudonym enrichment system may operate. In certain embodiments, a pseudonym generator 1102 is used to generate pseudonyms for one or more entity names. In certain embodiments, the pseudonym generator 1102 may include a random number generator 1104 to generate random numbers that are used to select words from one or more lists 1106 for use in pseudonymizing an entity. In certain embodiments, multiple lists may be used such as those shown here as LIST 1, LIST 2, and LIST 3. In certain embodiments, the words in a list may be selected from commonly used words in one or more domains. In the example of FIG. 11, LIST 1 includes words from a domain including common first names. LIST 2 includes words from a color domain and a city domain. LIST 3 includes words from an animal domain. However, it will be recognized that a greater number or fewer number of lists may be employed and that the words in such lists need not be derived from common domains.

In certain embodiments, the entity names and corresponding pseudonyms are stored in a pseudonym table 1108. In the example shown in FIG. 12, each entity name is associated with a three word pseudonym, where the first word is randomly selected from LIST 1, the second word is randomly selected from LIST 2, and the third word is randomly selected from LIST 3. In the illustrated examples, the entity name "Adrianna Lisetta" has an entity pseudonym of "Amber Austin Bat", where the entity pseudonym is used to identify security risk related behaviors. Likewise, the entity name "Bobby Polit" as an entity pseudonym of "Adam Red Fish", the entity name "Lynn Russo" as an entity name "Becky Brown Horse", etc.

In certain embodiments, the pseudonym table 1108 is encrypted and/or stored on a separate hardware or storage device so that the entity names and corresponding entity pseudonyms are available only to select authorized users, such as a security administrator. In certain embodiments, for example, only the security administrator is allowed to access the pseudonym table 1108 to correlate an entity pseudonym with the corresponding entity name. Other personnel having access to security related risks and/or behaviors for an entity will be able to identify entities by their entity pseudonyms. However, in certain embodiments, when security related risks and/or behaviors are identified using an entity pseudonym, personnel concerned about the risks and/or behaviors may seek the identification of the corresponding entity name through the security administrator. In certain embodiments, all entity names that may occur in the stream of events have a corresponding entity pseudonym. In certain embodiments, only select entity names that may occur in the stream of events have a corresponding entity pseudonym.

The present disclosure recognizes various advantages that are associated with using entity pseudonyms as opposed to entity names to identify security related risks and/or behaviors. In certain embodiments, prejudices and biases of personnel reviewing security analytics for an entity may be reduced if the reviewing personnel cannot directly identify the entity. In certain embodiments, entity anonymity allows an organization to address security issues in a private manner without damage to the reputation of the entity throughout large portions of the organization.

In certain embodiments, the pseudonym enrichment system 124 receives a plurality of events 1110. In certain embodiments, the plurality of events 1110 have been resolved prior to provision to the pseudonym replacement system 122. In certain embodiments, the event 1110 are in the form of a stream of raw events that are resolved by an entity name resolution engine 1112. In certain embodiments, the pseudonym enrichment system 124 uses an entity name identification engine 1114 to identify entity names within the resolved events. In certain embodiments, entity names found by the entity name extraction engine 1114 are checked by a comparison engine 1116 to determine whether an extracted entity name has a corresponding entity pseudonym in the pseudonym table 1108. In certain embodiments, entity names found in the pseudonym table 1108 by the comparison engine 1116 are replaced by corresponding entity pseudonyms by a pseudonym enrichment engine 1118. In certain embodiments, the pseudonym enrichment engine 1118 enriches the event with the pseudonym name corresponding to the original entity name found in the event to generate pseudonymized events 1120, which are provided to security analytics system 118 for analysis.

Figure 12:
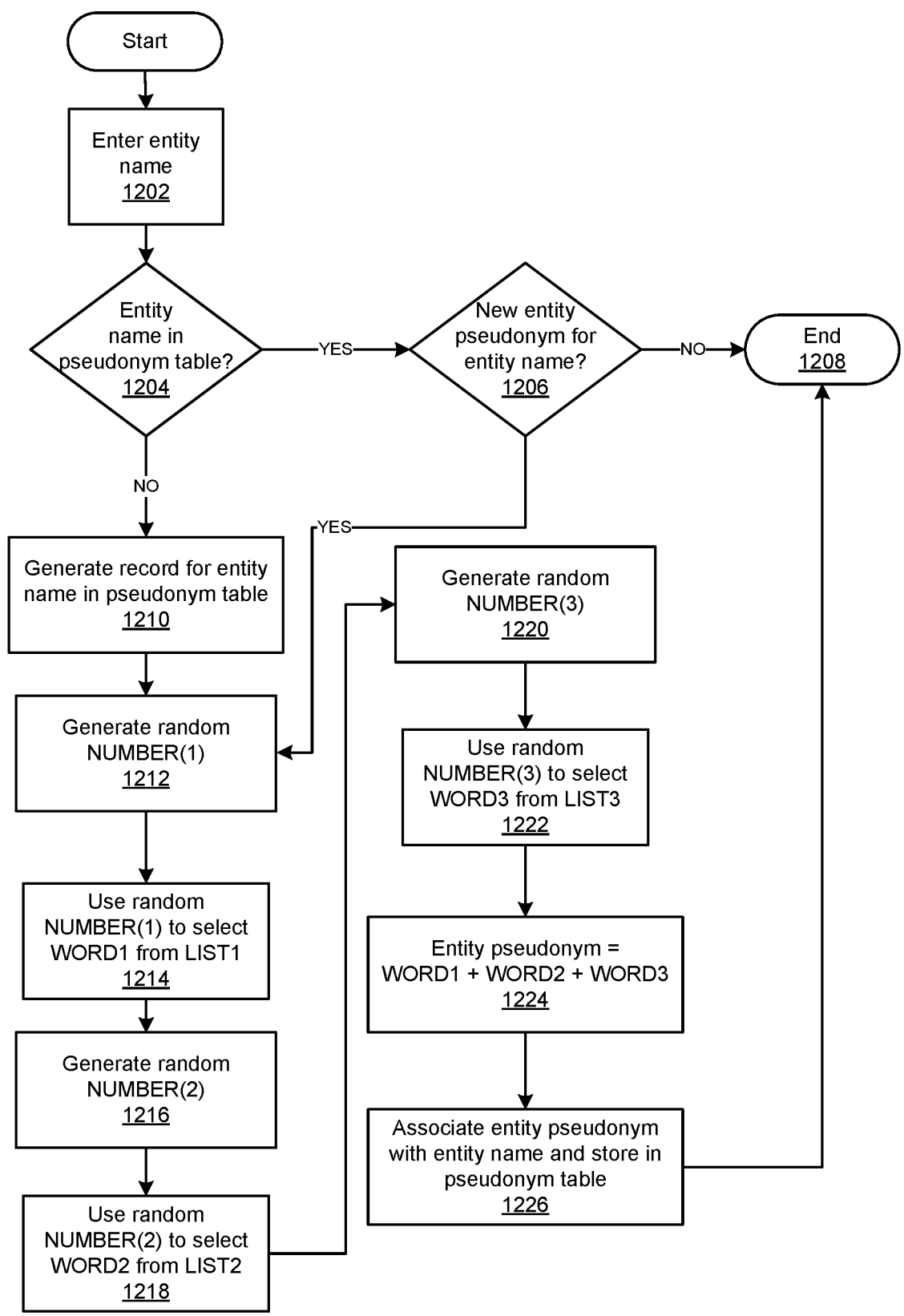
FIG. 12 is a flowchart depicting exemplary operations that may be executed by certain embodiments of the pseudonym generator.

FIG. 12 is a flowchart depicting exemplary operations that may be executed by certain embodiments of the pseudonym generator 1102. In certain embodiments, the name of an entity that is to be pseudonymized is entered at operation 1202, and a check is made at operation 1204 to determine whether the entity name already exists in the pseudonym table. In certain embodiments, if the pseudonym table already includes the entity name, a determination is made at operation 1206 as to whether a new entity pseudonym is to be generated for the entity name. In certain embodiments, if a new entity pseudonym is not to be generated for the existing entity name, the entity pseudonym generation process may terminate at operation 1208. Otherwise, in certain embodiments, if the pseudonym table does not yet include the entity name, an initial record for the entity name is generated in the pseudonym table at operation 1210.

Exemplary operations that may be used in certain embodiments to select the words that are to be used in the entity pseudonym for the entered entity name are shown in operations 1212 through 1222. In certain embodiments, the random number generator 1104 generates a first random number, NUMBER(1), at operation 1212. In certain embodiments, the first random number, NUMBER(1) is used to select the first word WORD1 for the entity pseudonym from LIST1 at operation 1214. In certain embodiments, the random number generator 1104 generates a second random number, NUMBER(2), at operation 1216. In certain embodiments, the second random number, NUMBER(2) is used to select the second word, WORD2, for the entity pseudonym from LIST2 at operation 1218. In certain embodiments, the random number generator 1104 generates a third random number, NUMBER(3), at operation 1220. In certain embodiments, the third random number, NUMBER (3) is used to select the third word WORD3 for the entity pseudonym from LIST3 at operation 1222.

In certain embodiments, the entity pseudonym may be generated at operation 1224 by combining WORD1, WORD2, and WORD3 to provide a three word entity pseudonym. Examples of such three word entity pseudonyms are shown in pseudonym table 1108. In certain embodiments, the entity pseudonym is associated with the corresponding entity name and stored in the pseudonym table 1108 at operation 1226 before the entity name generation process is terminated at operation 1208.

In certain embodiments, the words used to generate entity pseudonyms do not have an identifiable relationship with the actual entity names since the words used to generate the entity pseudonyms are selected using random operations. In certain embodiments, large organizations having a substantial number of entities may use larger word lists than those used by smaller organizations so as to reduce the likelihood of entity pseudonym collisions. In certain embodiments, various operations shown in FIG. 12 may be used to update one or more of the entity pseudonyms in pseudonym table 1108. In certain embodiments, all entity pseudonyms for all of the entity names in the pseudonym table 1108 may be periodically or sporadically updated.

Although the words selected for the entity pseudonym in FIG. 12 are based on the generation of random numbers, certain embodiments may employ different manners of word selection. In certain embodiments, for example, one or more portions of the entity name may be hashed to generate a number used for the word selection. In certain embodiments, only a single list having multiple word entity pseudonyms is used to generate the pseudonym for the entity name. Based on the teachings of the present disclosure, it will be recognized that various manners of generating an entity pseudonym for an entity name may be utilized.

Figure 13:
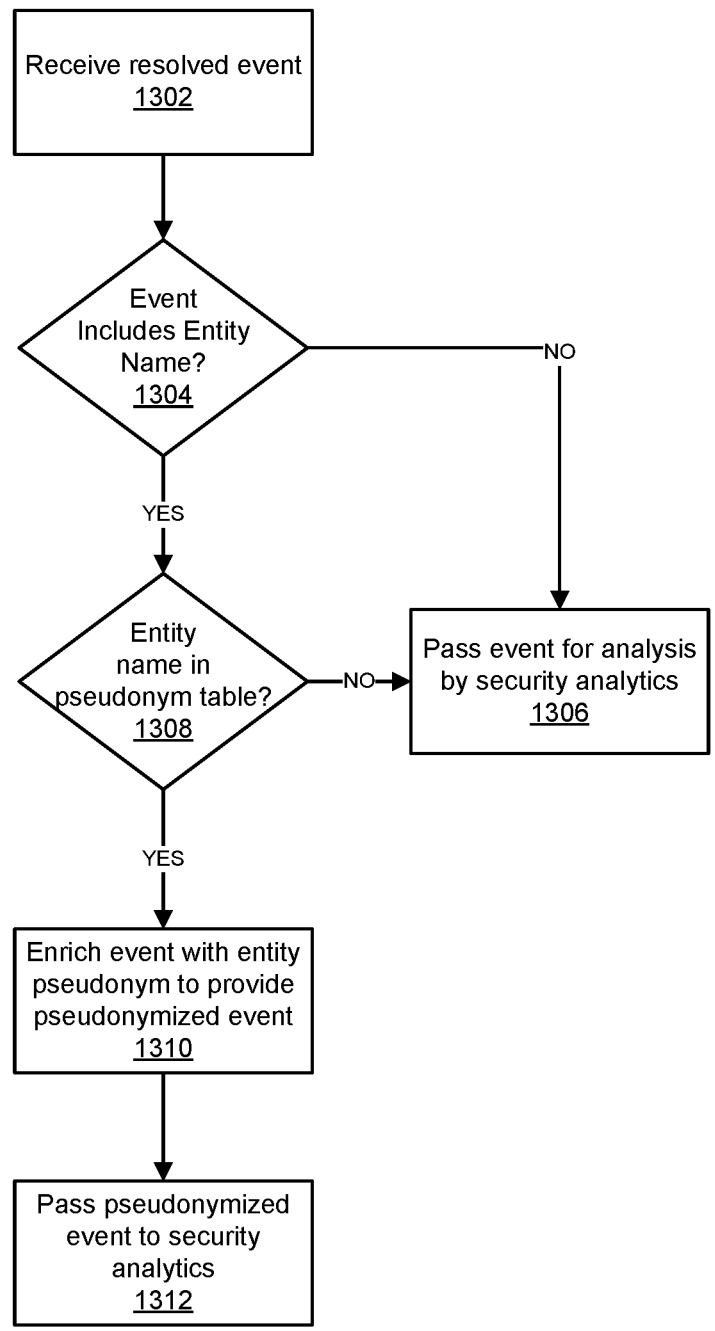
FIG. 13 is a flowchart depicting exemplary operations that may be executed by certain embodiments of the comparison engine and pseudonym enrichment engine.

FIG. 13 is a flowchart depicting exemplary operations that may be executed by certain embodiments of the comparison engine 1116 and pseudonym enrichment engine 1118. In certain embodiments, an event is received at operation 1302 and a check is made at operation 1304 as to whether the event includes an entity name. In certain embodiments, the event may be passed for analysis by the security analytics at operation 1306 when the event does not include an entity name. In certain embodiments, a determination is made at operation 1308 whether an entity name found in the event is included in the pseudonym table. In certain embodiments, the event may be passed for analysis by the security analytics at operation 1306 if the entity name is not found in the pseudonym table at operation 1308. If the entity name is found in the pseudonym table at operation 1308, the event is enriched with an entity pseudonym to provide a pseudonymized event 1310. The pseudonymized event can be passed to security analytics 1312.

Figure 14:
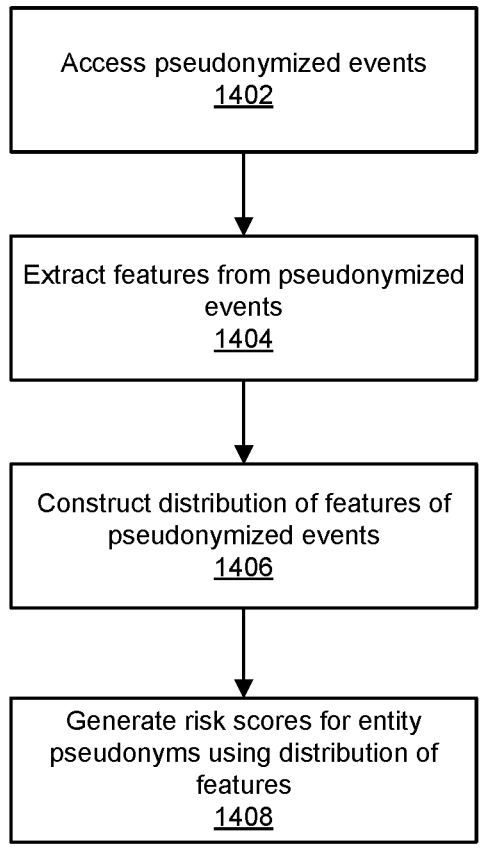
FIG. 14 is a flowchart depicting exemplary operations that may be executed in certain embodiments to analyze pseudonymized events.

FIG. 14 is a flowchart depicting exemplary operations that may be executed in certain embodiments to analyze pseudonymized events. In certain embodiments, pseudonymized events are accessed at operation 1402. In certain embodiments, the events are accessed and substantially real-time as the stream of events is pseudonymized by the pseudonym enrichment system 124. In certain embodiments, pseudonymized events are stored by the pseudonym enrichment system 124 in persistent memory for subsequent batch processing during the analysis operations. In certain embodiments, features are extracted from the pseudonymized events at operation 1404. In certain embodiments, a distribution of features of the pseudonymized events is constructed at operation 1406. In certain embodiments, risk scores for the entity pseudonyms are generated at operation 1408 using the distribution of features constructed during operation 1406.

In certain embodiments, distributed ledger technology or DLT can be used in storing information or data or protected data that has been de-identified, pseudonymized, or associated with a pseudonym. DLT includes block chain, hashgraph, block directed acyclic graphs (blockDAG), transaction based directed acyclic graphs (TDAG), etc.

In certain implementations, when such protected data is accessed, such as de-identified data from a distributed ledger, a record can be performed on the distributed ledger \ as to attempt to access the de-identified data. Such an attempt can be in the form of a re-identification operation. In certain implementations, the re-identification operation includes a description of personal data that is masked within the de-identified data. In certain implementations, the record can be created and stored to the distributed ledger when the re-identification process is performed. Such a record provides auditability when re-identifying pseudonymized data in the distributed ledger. In instances, when de-identified data is accessed, additional information may be needed to re-identify the de-identified or pseudonymized data. For example, a re-identification key may be required to re-identify the de-identified data. The additional information, such as the re-identification key can be kept in the distributed ledger. In certain implementations, such additional information, such as the re-identification key, can be associated with a pseudonym and stored in the distributed ledger.

Various encryption processes be implemented in de-identifying and re-identifying data, such as sensitive personal information (SPI) or other personally identifiable information (PII), which can use a combination of algorithms that can include hashing, data compression, symmetric-key cryptography, and public-key cryptography, etc.

In certain implementations, it may be desirable to access information that is part of SPI or PII. However, there may be "right to be forgotten" where an entity desires their identity or association to the SPI or PII be deleted or anonymized. In such cases, in certain implementations, a pointer or other instrumentality can be provided to access de-identified information or data in the distributed ledger, instead of providing the SPI or PII information. In such cases, if the "right to be forgotten" is invoked by a user or entity, the underlying data could be removed or deleted without needing to alter the pointer or other instrumentality stored in the distributed ledger.

Figure 15:
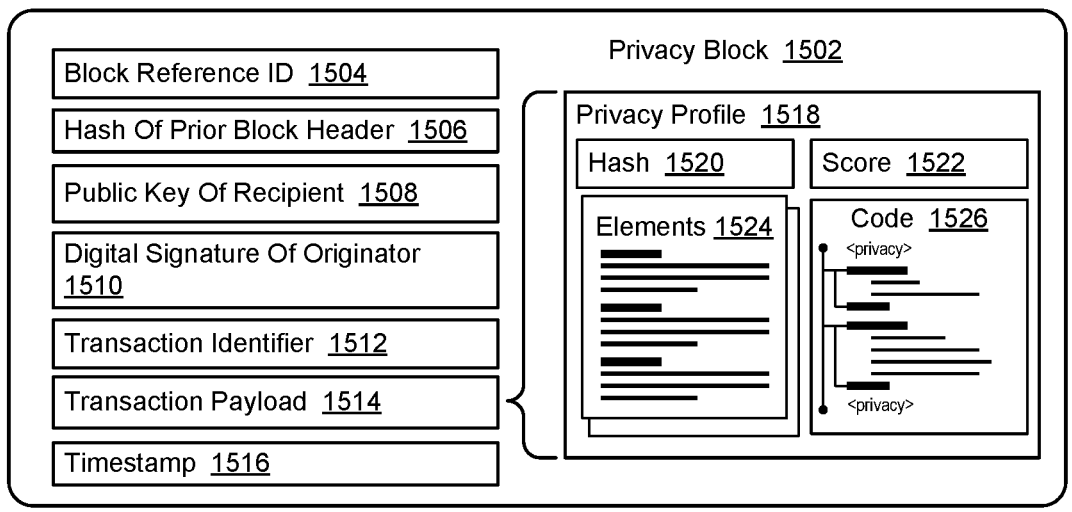
FIG. 15 is a simplified block diagram of a privacy block in a block chain.

FIG. 15 is a simplified block diagram of a privacy block in a block chain implemented in accordance with an embodiment of the invention. Although a block chain is described, it is to be understood that other DLTs can be implemented. The described block chain is one example of a DLT that can be implemented in practicing the invention.

In certain implementations, normalization occurs when a user begins implementing a user or endpoint device 304, such as logging keystrokes on an input device. It can be desirable to maintain privacy for user information, when normalization occurs. For example, the user can be providing information that is private or personal information, that can include sensitive personal information (SPI), or other personally identifiable information (PII), PD and other user-specific information which can be included in an adaptive trust profile (ATP). In certain instances, such information is re-identified, and identifies the source of the information or data, such as the certain entity or user. This re-identification can be available to a security administrator, such as security administrator 868, to determine the source (i.e., user) of the information or data (personal information).

Figure 16:
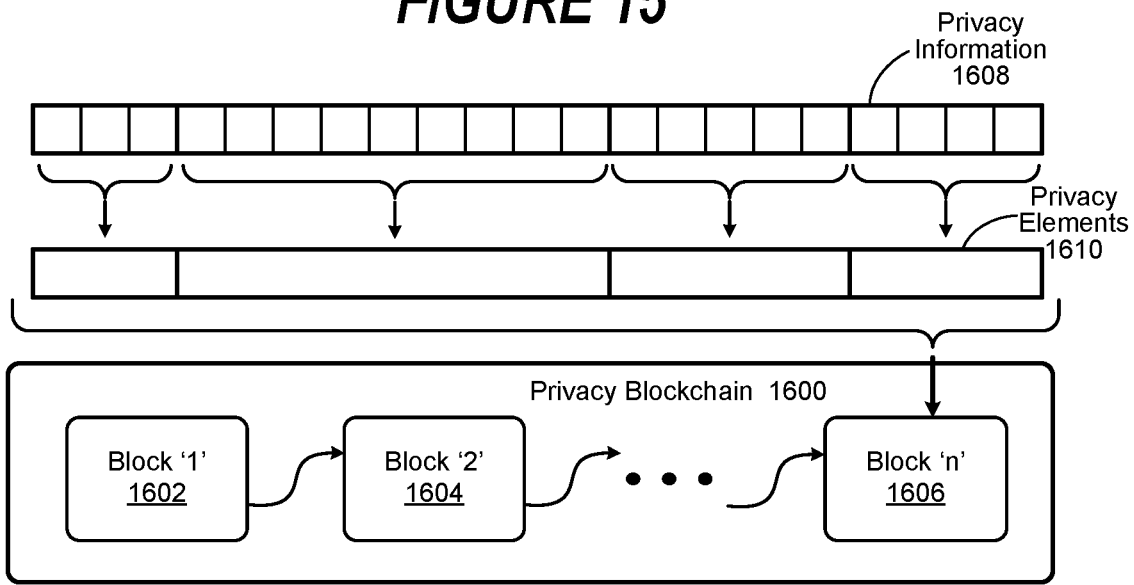
FIG. 16 is a simplified block diagram of interaction with user information and a privacy block chain.
Figure 16:
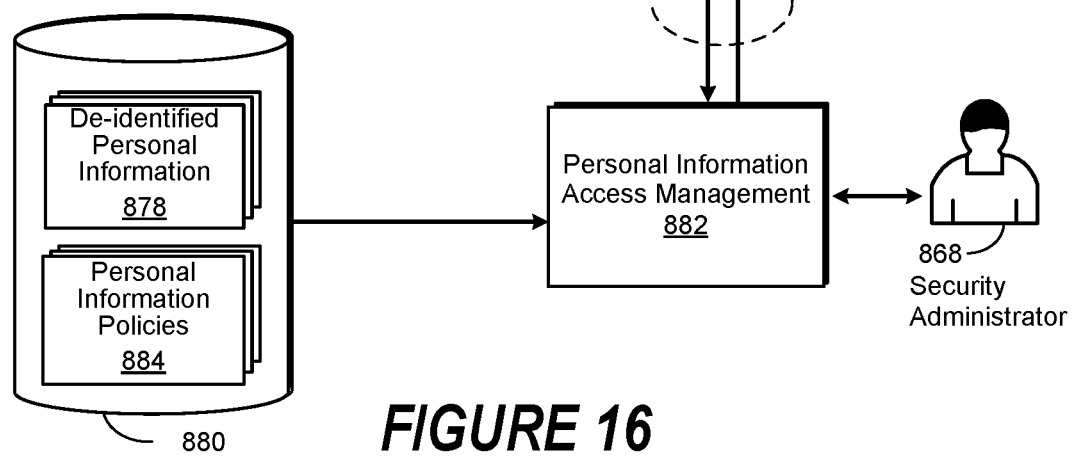

In various embodiments, a privacy block chain 1600, as shown in FIG. 16 below, may contain one or more privacy blocks 1502, such as privacy block '1' 1602, and '2' 1604 through 'n' 1604. The privacy block chain 1600 allows for privacy enhancement of the user or entity information. In these embodiments, each privacy block 1502 may include either or both data and metadata, such as a block reference identifier (ID) 1804 (which can be a pointer ID value), a hash value of the prior privacy block's header 1506 information, the public key of the recipient/user 1508 of the privacy block chain 1600 transaction, and the digital signature of the originator/user 1810 of the privacy block chain 1600 transaction. The privacy block 1502 may likewise include additional either or both data and metadata, such as a privacy block chain transaction identifier 1512, a transaction payload 1514, and a transaction timestamp 1516.

In certain embodiments, the transaction payload 1514 may include one or more privacy profiles 1518. In various embodiments, privacy profile 1518 may include various user privacy elements 1524, described in greater detail herein, and a hash 1520 value of the user privacy elements 1524. In certain embodiments, the hash 1520 value is implemented to determine whether the integrity of the user privacy elements 1524 has been compromised. In various embodiments, the privacy profile 1518 may include executable code 1526. In certain embodiments, the executable code 1526 may be used by a security analytics system 118, described in greater detail herein, to detect acceptable, anomalous, malicious and unknown behavior being enacted by a user. In various embodiments, user privacy data contained in one or more user privacy elements 1524 is used in combination with the executable code to perform user behavior monitoring operations, likewise described in greater detail herein. In certain embodiments, the executable code can include state information such as pre-calculated information associated with one or more user privacy elements 1524. In certain embodiments, the executable code 1526 can include a mapping of the user. Furthermore, in certain implementations, the executable code 1826 can include code that deletes a personal key in the block chain 1900 that allows the user to be "forgotten." Therefore, implementing privacy enhancement through use of a block chain, such as block chain 2300, user information includes a right to be forgotten function that can cause the user information to be deleted at the request of the user. In other implementations, executable code 1826 can provide auditable privacy that can include a re-identifying function that includes a logging function that can provide an audit trail for any re-identifying function request associated with user information of the user. In certain implementations, pseudonymization or de-identification of the user is provided through privacy enhancement of the user information, when a security administrator accesses the user information. Pseudonymization or de-identification can be provided during privacy enhancement, when an authority, such as a security administrator accesses user information. Such a pseudonymization or de-identification can be performed as information or data is ingested or added to an adaptive trust profile. In certain implementations, an adaptive trust profile includes sensitive personal information (SPI).

In certain embodiments, the privacy block 1502 may also contain a risk score 1822. In certain embodiments, the risk score includes a user privacy score. In various embodiments, the risk score 1522 may be used by a user behavior monitoring system to assess the state (e.g., the risk or trustworthiness) of a particular user. In certain embodiments, the state may also be stored within the privacy block 1502. In certain embodiments, the state is assessed at a specific time and has a time associated with the state.

FIG. 16 is a simplified block diagram of interaction with user information and a privacy block chain. As used herein, a block chain broadly refers to a data structure that is tamper evident and appendable. In certain embodiments, a block chain further refers to a decentralized, distributed data structure whose contents are replicated across a number of systems. These contents are stored in a chain of fixed structures commonly referred to as "blocks," such as privacy block '1' 1602, privacy block '2' 1604, and so forth, through privacy block 'n' 1604. Each of these blocks are considered as immutable store and contains certain information about itself, such as a unique identifier, a reference to its previous block, and a hash value generated from the data it contains. As an example, privacy block '2' 1604 would contain a reference to user privacy '1 1602, yet their respective hashes values would be different as they contain different data.

Those of skill in the art will be aware that DLTs may be implemented in different ways and for different purposes. However, these different implementations typically have certain common characteristics. For example, in certain embodiments, distributed ledgers are generally distributed across various systems, each of which maintains a copy of the distributed ledger. Updates to one copy of the distributed ledger, for example for block chain 1600 such as the addition of a privacy block 'n' 1906, results in corresponding updates to the other copies. Accordingly, the contents of a distributed ledger, including its most recent updates, are available to all participating users of the distributed ledger, who in turn use their own systems to authenticate and verify each new "block." This process of authentication and verification ensures that the same transaction does not occur more than once. Furthermore, with distributed ledgers, the legitimacy of a given "block", and its associated contents, is only certified once a majority of participants agree to its validity.

In general, the distributed and replicated nature of a distributed ledger, such as a privacy block chain 1600, makes it difficult to modify historical records without invalidating any subsequent blocks added thereafter. As a result, the user behavior data within a given privacy block chain 1600 is essentially immutable and tamper-evident. However, this immutability and tamper-evidence does not necessarily ensure that the user behavior data recorded in the privacy block chain 1600 can be accepted as an incontrovertible truth. Instead, it simply means that what was originally recorded was agreed upon by a majority of the privacy block chain 1600 participants.

Additionally, certain embodiments include an appreciation that every transaction in a block chain is serialized (i.e., stored in a sequence). Additionally, in certain embodiments, every transaction in a block chain is time-stamped, which is useful for tracking interactions between participants and verifying various information contained in, or related to, a block chain. Furthermore, instructions can be embedded within individual blocks of a block chain. These instructions, in the form of computer-executable code, allow transactions or other operations to be initiated if certain conditions are met.

Groups of user privacy information 1608 can be combined in various embodiments to generate one or more associated user privacy elements 1610. In certain embodiments, the user privacy information 1608 are used to generate a user privacy element 1610. In certain embodiments, the resulting user privacy elements 1610 are in turn combined to generate a privacy block, such as privacy block 'n' 1606. The resulting privacy block is then appended to a target privacy block chain, such as privacy block chain 1600. As used herein, a privacy block broadly refers to a block chain block implemented to contain various user privacy information. As likewise used herein, privacy information broadly refers to any user specific PD, such as for example sensitive personal information (SPI or other personally identifiable information (PII), and other user specific information such as an adaptive trust profile (ATP).

In various embodiments, the privacy block chain 1600 is implemented to contain one or more privacy profiles 1518, described above. In an embodiment, the block chain 1600 contains a single user behavior profile 1518, which in turn is associated with an individual user. In this embodiment, privacy blocks '1' 1602 and '2' 1604 through 'n' 1606 are associated with the individual user. In another embodiment, the privacy block chain 1600 is implemented to include user behavior profiles 1618 associated with two or more users. In this embodiment, individual privacy blocks '1' 1602 and '2' 1604 through 'n' 1606 are respectively associated with two or more privacy profiles 1518, which in turn are respectively associated with a particular user. In certain embodiments, the privacy block chain 1600 is parsed to identify which of the privacy blocks '1' 1602 and '2' 1604 through 'n' 1606 are associated with a given privacy profile 1518, which in turn are respectively associated with a particular user.

In various embodiments, data associated with a given privacy block chain 1600 is used in the performance of user behavior monitoring operations to detect attempted, either acceptable or malicious, access by "users". In certain embodiments, the performance of these privacy monitoring operations involve comparing a newly generated privacy block, such as privacy block 'n' 1606 to previously generated privacy blocks, such as privacy blocks '1' 1602 and '2' 1604.

In certain embodiments, if the contents of the privacy block 'n' 1606 are substantively similar to the contents of privacy blocks '1' 1602 and '2' 1604, then the user access may be judged to be acceptable. However, if the contents of the privacy block 'n' 1606 are substantively dissimilar to the contents of privacy blocks '1' 1602 and '2' 1604, then the user access may be judged to be anomalous, malicious or unknown. In these embodiments, the method by which the contents of privacy block 'n' 1606 are determined to be substantively similar, or dissimilar, to the contents of privacy blocks '1' 1602 and '2' 1604 is a matter of design choice.

In certain implementations, a two-way interaction 1612 is provided to allow re-identification of personal information on the privacy block chain 1600. Such a two-way interaction 1612 can be a smart contract, etc. Re-identification can be performed on de-identified personal information 878 stored in an anonymous information and personal information policy repository 880 shown in FIG. 8b. The de-identified personal information 878 can be written to the block chain 1600 and accessed by an authorized authority. An authorized authority, such as security administrator 868 through the personal information access management system 882 can use access the block chain 1900 to re-identify the de-identified personal information 878 on the block chain 1600.

In certain implementations, when a re-identification operation is performed on de-identified data, a record can be created and stored to the distributed ledger, such as the block chain 1600. The record can be associated with a pseudonym that is associated with an entity. In certain implementations, the record includes a date and time of the re-identification operation. Certain implementations provide that the record includes a description of categories of data subjects of the de-identified data.

In certain implementations, an authorized authority, such as security administrator 868 initiates the re-identification operation. A particular purpose(s) may be associated as to the re-identification operation. In certain implementations, the purpose can be part of the record when the re-identification operation is performed. The record can also include contact details of the security administrator 868.

Figure 17:
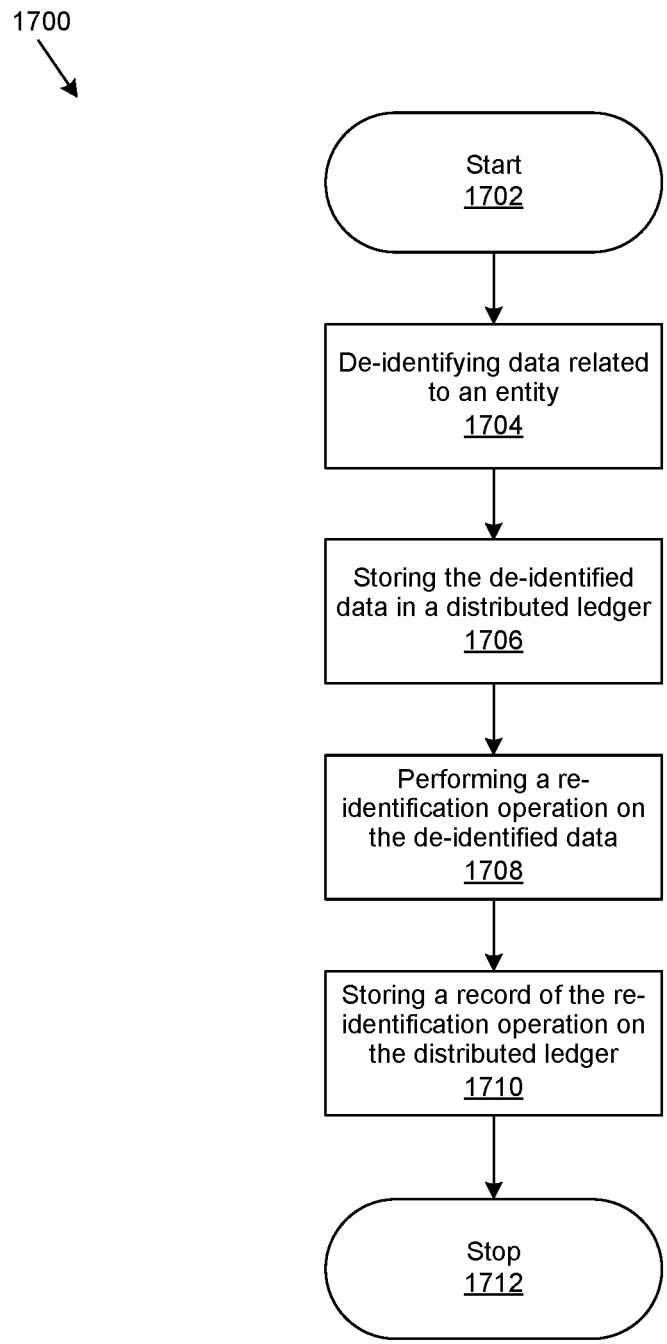
FIG. 17 is a generalized flowchart for providing auditability of re-identified data in a distributed ledger technology.

FIG. 17 is a generalized flowchart 1700 for providing auditability of re-identified data using a distributed ledger technology. Process 1700 can be implemented for managing re-identification of de-identified data utilizing a distributed ledger. The distributed ledger is part of a distributed ledger technology (DLT). As discussed, various DLT can be implemented, including block chain, hashgraph, block directed acyclic graphs (blockDAG), transaction based directed acyclic graphs (TDAG), etc.

At block 1702, the process 1700 starts. At step 1704, information or data related to an entity, such as sensitive personal information (SPI) or other personally identifiable information (PII) is de-identified. The de-identified data can include a pseudonym associated with the entity. An encryption process can be implemented using cryptographic keys\. In certain implementations, a re-identification key is part of the encryption/decryption process and can be associated with the entity or the pseudonym that is associated with the entity.

At step 1706, the de-identified data is stored to a distributed ledger, such as a block chain. In certain implementations, keys or other information used in pseudonymization or the de-identification process are stored to the distributed ledger, such as storing the re-identification key that is associated with the entity or the pseudonym that is associated with the entity to the distributed ledger.

At step 1708, a re-identification operation is performed on the de-identified data. In certain implementations, the re-identification operation uses the re-identification key to re-identify the de-identified data. In certain implementations, the re-identification operation is initiated by a security administrator.

At step 1710, a record of the re-identification operation is stored in the distributed ledger. In certain implementations, the record can be associated with the pseudonym that is associated with the entity. In certain implementations, the record includes a purpose as to performing the re-identification process. The record can include a description of categories of data subjects of the de-identified data and/or include a description of personal data that is contained in the de-identified data. The record can also include a date and a time of the re-identification operation. At block 1712, the process 1700 ends.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for managing re-identification of de-identified data utilizing a distributed ledger, comprising:
   de-identifying an event stream of one or more events associated with an individual, wherein de-identified data includes a pseudonym and personal information of an individual;
   extracting the de-identified data that includes the personal information of the individual from the event stream, and comprises using entity profiles to determine identified data that are included in the event stream that is de-identified using a pseudonym to protect the identified data;
   storing the de-identified data that includes the personal information of the individual in the distributed ledger;
   performing a re-identification operation on the de-identified data using entity identifier information that includes authentication factors, user profile attributes, user behavior factors, user mindset factors, information associated with various endpoint and edge devices, networks, resources;
   storing a record of the re-identification operation in the distributed ledger that includes an adaptive trust profile (ATP) of the individual comprising context of user behavior and associated risk factors; and
   performing risk analysis based on the ATP of the individual.

2. The method of claim 1, wherein the distributed ledger is a block chain.

3. The method of claim 1, wherein the record of the re-identification operation is associated with the pseudonym.

4. The method of claim 1 further comprising storing a re-identification key associated with the pseudonym in the distributed ledger.

5. The method of claim 4, wherein the re-identification operation uses the re-identification key to re-identify the de-identified data.

6. The method of claim 1, wherein the record of the re-identification operation comprises a purpose for performing the re-identification operation.

7. The method of claim 1, wherein the record of the re-identification operation comprises a description of categories of data subjects of the de-identified data.

8. The method of claim 1, wherein the record of the re-identification operation comprises a description of personal data contained in the de-identified data.

9. The method of claim 1, wherein the record of the re-identification operation comprises a date and a time of the re-identification operation.

10. The method of claim 1, wherein the step of performing the re-identification operation is initiated by a security administrator, and wherein the record of the re-identification operation comprises contact details of the security administrator.

11. The method of claim 1 further comprising storing a re-identification key associated with the entity in the distributed ledger.

12. The method of claim 11, wherein the re-identification operation uses the re-identification key to re-identify the de-identified data.

13. The method of claim 1, wherein the record includes a pointer to a second record in a database external to the distributed ledger, the second record containing details of the re-identification operation.

14. A computer-implementable method for managing privacy in a cybersecurity system comprising:
identification of de-identified data utilizing a distributed ledger, comprising:
de-identifying an event stream of one or more events associated with an individual, wherein de-identified data includes a pseudonym and personal information of an individual;
extracting the de-identified data that includes the personal information of the individual from the event stream, and comprises using entity profiles to determine identified data that are included in the event stream that is de-identified using a pseudonym to protect the identified data;
storing the de-identified data that includes the personal information of the individual in the distributed ledger;
performing a re-identification operation on the de-identified data using entity identifier information that includes authentication factors, user profile attributes, user behavior factors, user mindset factors, information associated with various endpoint and edge devices, networks, resources;
storing a record of the re-identification operation in the distributed ledger that includes an adaptive trust profile (ATP) of the individual comprising context of user behavior and associated risk factors; and
performing risk analysis based on the ATP of the individual.

15. The method of claim 14 wherein a trigger to the security analysis, the cybersecurity system further performs a re-identification operation, wherein the record of the re-identification operation is stored in the cloud using the distributed ledger.

16. A system comprising:
a processor;
a data bus coupled to the processor; and
a non-transitory, computer-readable storage medium embodying computer program code for managing re-identification of de-identified data utilizing a distributed ledger, the non-transitory, computer-readable storage medium being coupled to the data bus, the computer program code interacting with a plurality of computer operations and comprising instructions executable by the processor and configured for:
de-identifying an event stream of one or more events associated with an individual, wherein de-identified data includes a pseudonym and personal information of an individual;
extracting the de-identified data that includes the personal information of the individual from the event stream, and comprises using entity profiles to determine identified data that are included in the event stream that is de-identified using a pseudonym to protect the identified data;
storing the de-identified data that includes the personal information of the individual in the distributed ledger;
performing a re-identification operation on the de-identified data using entity identifier information that includes authentication factors, user profile attributes, user behavior factors, user mindset factors, information associated with various endpoint and edge devices, networks, resources;
storing a record of the re-identification operation in the distributed ledger that includes an adaptive trust profile (ATP) of the individual comprising context of user behavior and associated risk factors; and
performing risk analysis based on the ATP of the individual.

17. The system of claim 16, wherein the distributed ledger is a block chain.

18. The system of claim 16, wherein the de-identified data further comprises a pseudonym associated with the individual.

19. The system of claim 18, wherein the record of the re-identification operation is associated with the pseudonym.

20. The system of claim 18 further comprising storing a re-identification key associated with the pseudonym in the distributed ledger.

21. The system of claim 20, wherein the re-identification operation uses the re-identification key to re-identify the de-identified data.

22. The system of claim 16, wherein the record of the re-identification operation comprises a purpose for performing the re-identification operation.

23. The system of claim 16, wherein the record of the re-identification operation comprises a description of categories of data subjects of the de-identified data.

24. The system of claim 16, wherein the record of the re-identification operation comprises a description of personal data contained in the de-identified data.

25. The system of claim 16, wherein the record of the re-identification operation comprises a date and a time of the re-identification operation.

26. The system of claim 16, wherein the step of performing the re-identification operation is initiated by a security administrator, and wherein the record of the re-identification operation comprises contact details of the security administrator.

27. The system of claim 16 further comprising storing a re-identification key associated with the entity in the distributed ledger.

28. The system of claim 27, wherein the re-identification operation uses the re-identification key to re-identify the de-identified data.

29. The system of claim 16, wherein the record includes a pointer to a second record in a database external to the distributed ledger, the second record containing details of the re-identification operation.

* * * * *